(12) United States Patent
Seo

(10) Patent No.: US 7,692,687 B2
(45) Date of Patent: Apr. 6, 2010

(54) ANTI-SHAKE APPARATUS

(75) Inventor: Shuzo Seo, Saitama (JP)

(73) Assignee: Hoya Corporation, Tokyo (JP)

( * ) Notice: Subject to any disclaimer, the term of this patent is extended or adjusted under 35 U.S.C. 154(b) by 1053 days.

(21) Appl. No.: 11/140,731

(22) Filed: Jun. 1, 2005

(65) Prior Publication Data

US 2005/0270379 A1    Dec. 8, 2005

(30) Foreign Application Priority Data

Jun. 8, 2004    (JP)    ............... P2004-169376

(51) Int. Cl.
*H04N 5/228*    (2006.01)
(52) U.S. Cl. .................. 348/208.5
(58) Field of Classification Search .......... 348/208.4, 348/208.5, 208.7, 208.13
See application file for complete search history.

(56) References Cited

U.S. PATENT DOCUMENTS

| | | | | |
|---|---|---|---|---|
| 4,731,669 A | * | 3/1988 | Hayashi et al. ......... | 348/208.7 |
| 7,307,653 B2 | * | 12/2007 | Dutta ................ | 348/208.7 |
| 2003/0067544 A1 | | 4/2003 | Wada | |

FOREIGN PATENT DOCUMENTS

| JP | 63-099680 | 4/1988 |
|---|---|---|
| JP | 10-142629 | 5/1998 |
| JP | 11-072815 | 3/1999 |
| JP | 2001-117129 | 4/2001 |
| JP | 2002-229090 | 8/2002 |
| JP | 2003-110919 | 4/2003 |

OTHER PUBLICATIONS

English language Abstract of JP 10-142629.
English language Abstract of JP 11-072815.
English language Abstract of JP 2001-117129.
English language Abstract of JP 2002-229090.
English language Abstract of JP 2003-110919.
U.S. Appl. No. 11/044,010 to Uenaka et al., filed Jan. 28, 2005.
U.S. Appl. No. 11/044,055 to Uenaka et al., filed Jan. 28, 2005.

(Continued)

*Primary Examiner*—David L Ometz
*Assistant Examiner*—Akshay Trehan
(74) *Attorney, Agent, or Firm*—Greenblum & Bernstein P.L.C.

(57) ABSTRACT

An anti-shake apparatus of a photographing apparatus comprises a movable unit and a fixed unit. The movable unit has an imaging device and can be moved and rotated on a plane which is perpendicular to an optical axis of a camera lens of the photographing apparatus. The fixed unit supports the movable unit in a movable and rotatable situation on the plane. The movable unit and fixed unit have a moving apparatus that moves and rotates the movable unit. A number of points that receive a first force in a first direction by the moving apparatus, is equal to or more than 1. The first direction is perpendicular to the optical axis. A number of points that receive a second force in a second direction by the moving apparatus, is equal to or more than 2. The second direction is perpendicular to the optical axis and the first direction.

19 Claims, 10 Drawing Sheets

OTHER PUBLICATIONS

U.S. Appl. No. 11/044,054 to Uenaka, filed Jan. 28, 2005.
U.S. Appl. No. 11/065,577 to Uenaka, filed Feb. 25, 2005.
U.S. Appl. No. 11/065,354 to Uenaka et al., filed Feb. 25, 2005.
U.S. Appl. No. 11/073,638 to Uenaka et al., filed Mar. 8, 2005.
U.S. Appl. No. 11/073,604 to Uenaka, filed Mar. 8, 2005.
U.S. Appl. No. 11/071,234 to Uenaka, filed Mar. 4, 2005.
U.S. Appl. No. 11/071,220 to Uenaka et al., filed Mar. 4, 2005.
U.S. Appl. No. 11/071,241 to Uenaka, filed Mar. 4, 2005.
U.S. Appl. No. 11/071,242 to Uenaka, filed Mar. 4, 2005.
U.S. Appl. No. 11/078,367 to Seo, filed Mar. 14, 2005.
U.S. Appl. No. 11/108,868 to Uenaka et al., filed Apr. 19, 2005.
U.S. Appl. No. 11/115,315 to Seo, filed Apr. 27, 2005.
U.S. Appl. No. 11/140,966 to Seo, filed Jun. 1, 2005.
U.S. Appl. No. 11/159,156 to Ogawa et al., filed Jun. 23, 2005.

* cited by examiner

ANTI-SHAKE APPARATUS

BACKGROUND OF THE INVENTION

1. Field of the Invention

The present invention relates to an anti-shake apparatus for a photographing device (apparatus), and in particular to a position-detecting apparatus for a movable unit that includes the imaging device etc., and that can be moved for correcting the hand-shake effect.

2. Description of the Related Art

An anti-shake apparatus for a photographing apparatus is proposed. The anti-shake apparatus corrects for the hand-shake effect by moving a hand-shake correcting lens or an imaging device on a plane that is perpendicular to the optical axis, corresponding to the amount of hand-shake which occurs during imaging.

Japanese unexamined patent publication (KOKAI) No. 63-099680 discloses an anti-shake apparatus for a photographing apparatus. The anti-shake apparatus performs linear movement and rotating operations of a movable unit, which includes a hand-shake correcting lens, by using a magnet and a coil, and performs a position-detecting operation of the movable unit, by using a hall element and a magnet. The linear movement operation is for correcting the linear movement component of the hand-shake of the photographing apparatus. The rotating operation is for correcting the rotational movement component of the hand-shake of the photographing apparatus.

However, the moving apparatus for the linear movement and the moving apparatus for the rotating are separated, so that the anti-shake apparatus is enlarged.

SUMMARY OF THE INVENTION

Therefore, an object of the present invention is to provide an apparatus in which the moving apparatus for performing the rotational component of the anti-shake operation, for the photographing apparatus, and the moving apparatus for performing the linear movement component of the anti-shake operation, for the photographing apparatus, is one body.

According to the present invention, an anti-shake apparatus of a photographing apparatus comprises a movable unit and a fixed unit.

The movable unit has one of an imaging device and a hand-shake correcting lens and can be moved and rotated on a plane which is perpendicular to an optical axis of a camera lens of the photographing apparatus.

The fixed unit supports the movable unit in a movable and rotatable situation on the plane.

The movable unit and fixed unit have a moving apparatus that moves and rotates the movable unit.

A number of points on the movable unit that receive a first force in a first direction by the moving apparatus, is equal to or more than 1. The first direction is perpendicular to the optical axis.

A number of points on the movable unit that receive a second force in a second direction by the moving apparatus, is equal to or more than 2. The second direction is perpendicular to the optical axis and the first direction.

The points on the movable unit that receive the first force in the first direction are on a first line which is parallel to or extends in the second direction.

The points on the movable unit that receive the second force in the second direction are on a second line which is parallel to or extends in the first direction.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
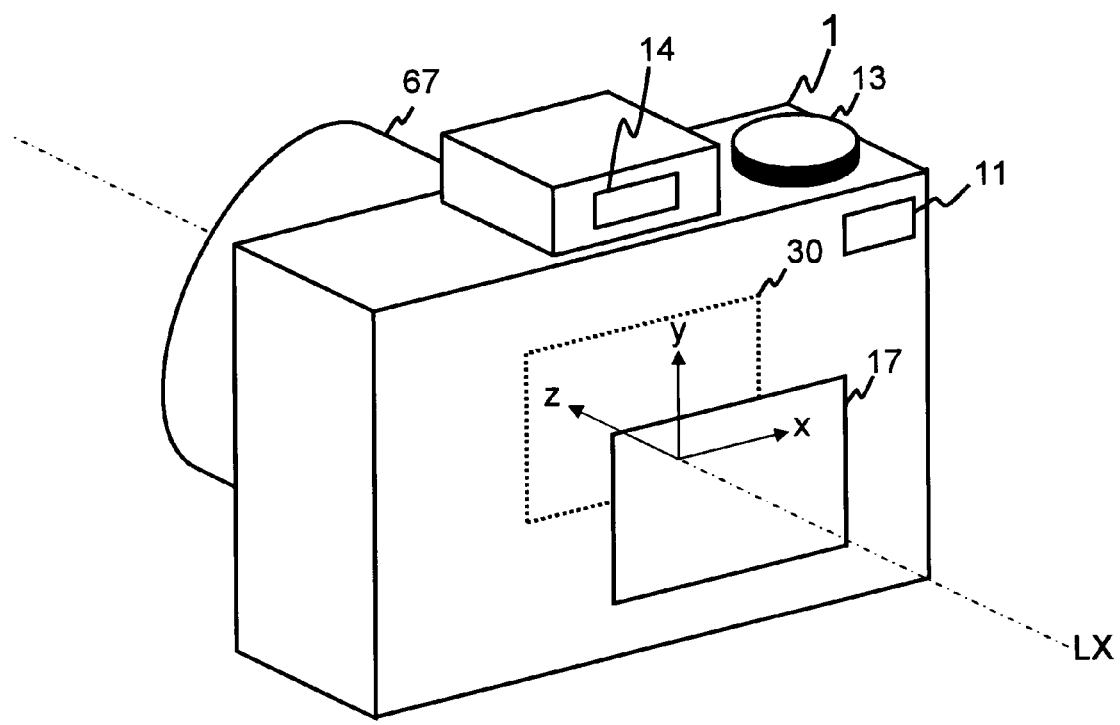
FIG. 1 is a perspective view of a photographing apparatus of the embodiments viewed from the back side of the photographing apparatus.

The present invention is described below with reference to the embodiments shown in the drawings. In these embodiments, the photographing apparatus 1 is a digital camera. The photographing apparatus 1 has an optical axis LX.

In order to explain the direction in this embodiment, a first direction x, a second direction y, and a third direction z are defined (see FIG. 1). The first direction x is a horizontal direction which is perpendicular to the optical axis LX. The second direction y is a vertical direction which is perpendicular to the optical axis LX and the first direction x. The third direction z is a horizontal direction which is parallel to the optical axis LX and perpendicular to both the first direction x and the second direction y.

A first embodiment is explained by using FIGS. 1 to 6.

Figure 4:
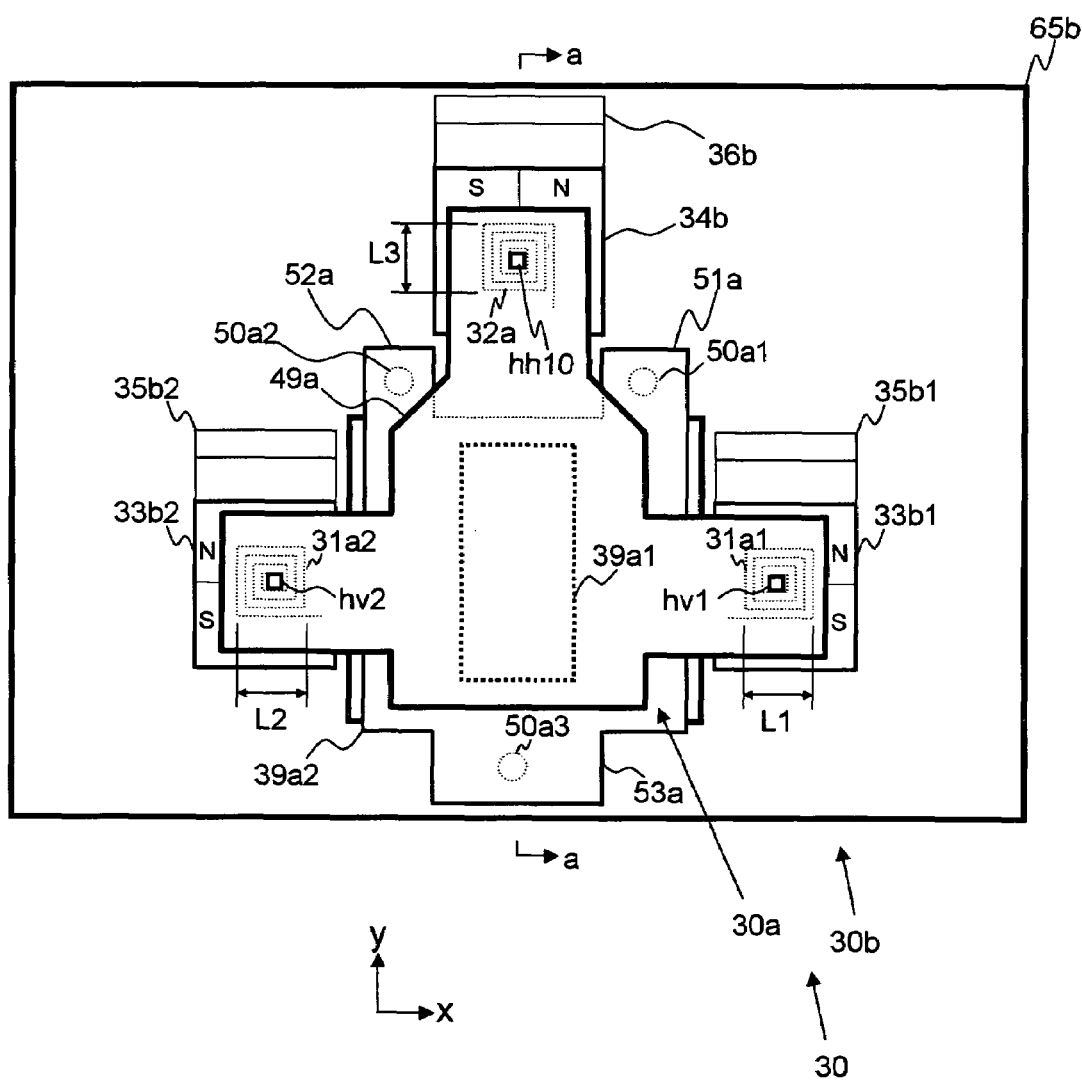
FIG. 4 is a figure showing the construction of the anti-shake unit, in the first embodiment.
Figure 5:
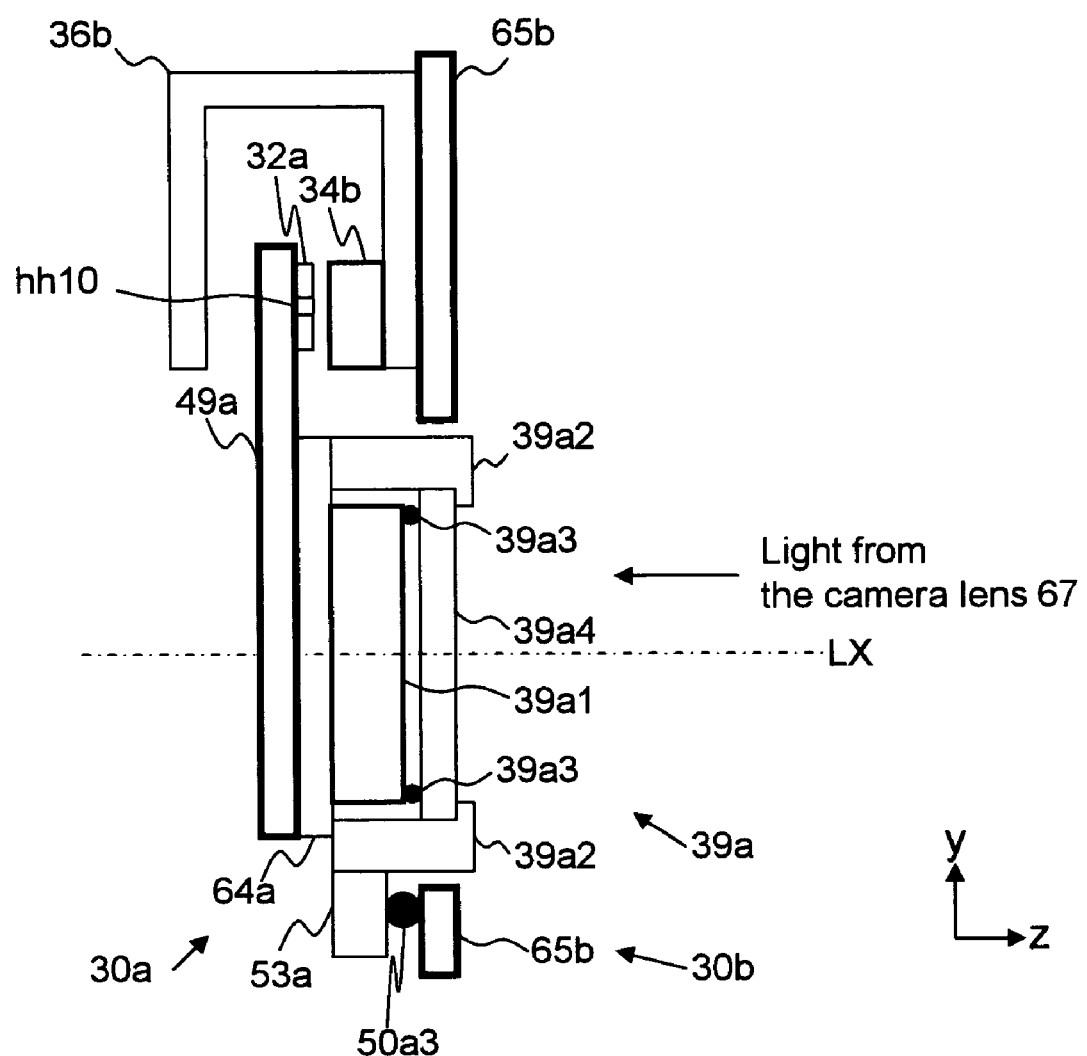
FIG. 5 is a view along line a-a of FIG. 4.

FIG. 5 shows a construction diagram of the section along line a-a of FIG. 4.

Figure 2:
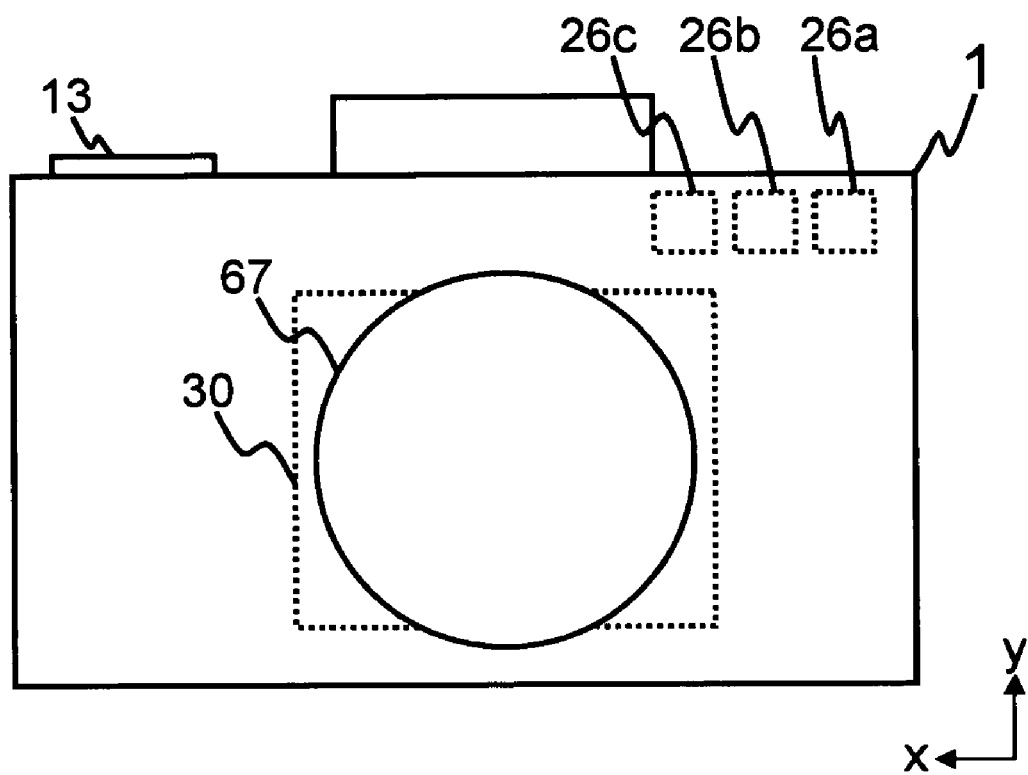
FIG. 2 is a front view of the photographing apparatus.
Figure 3:
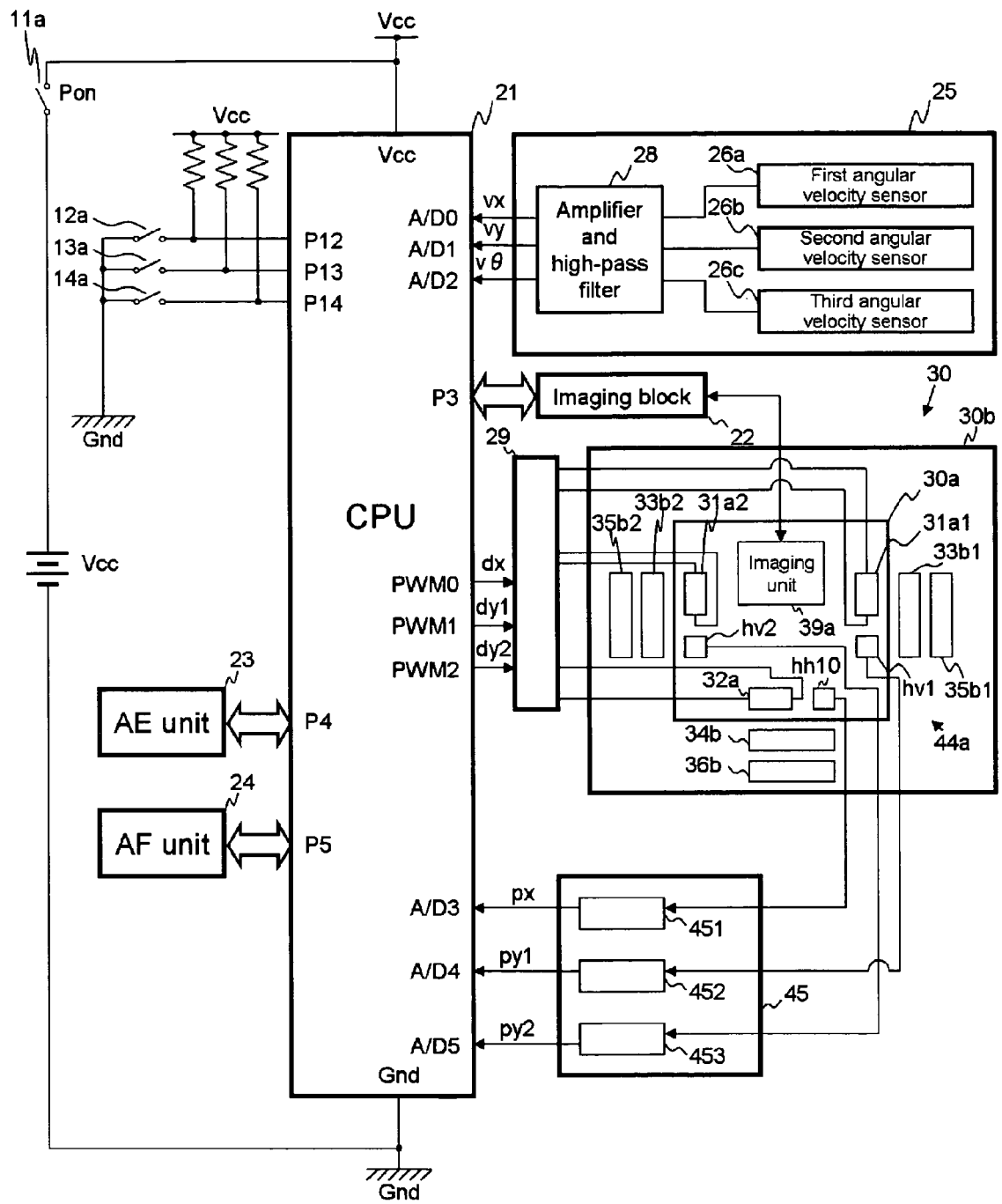
FIG. 3 is a circuit construction diagram of the photographing apparatus, in the first embodiment.

The imaging part of the photographing apparatus 1 comprises a Pon button 11, a Pon switch 11a, a photometric switch 12a, a release button 13, a release switch 13a, an indicating unit 17 such as an LCD monitor etc., a first CPU 21, an imaging block 22, an AE (automatic exposure) unit 23, an AF (automatic focusing) unit 24, an imaging unit 39a in the first anti-shake apparatus 30, and a camera lens 67 (see FIGS. 1, 2, and 3).

Whether the Pon switch 11a is in the on state or the off state, is determined by a state of the Pon button 11, so that the on/off states of the photographing-apparatus 1 are changed corresponding to the of/off states of the Pon switch 11a.

The photographic subject image is taken as an optical image through the camera lens 67 by the imaging block 22, which drives the imaging unit 39a, so that the image, which is taken, is indicated on the indicating unit 17. The photographic subject image can be optically observed by the optical finder (not depicted).

When the release button 13 is half pushed by the operator, the photometric switch 12a changes to the on state, so that the photometric operation, the AF sensing operation, and the focusing operation are performed.

When the release button 13 is fully pushed by the operator, the release switch 13a changes to the on state, so that the imaging operation is performed, and the image, which is taken, is stored.

The first CPU 21 is a control apparatus, which controls each part of the photographing apparatus 1 regarding the imaging operation, and controls each part of the photographing apparatus 1 regarding the anti-shake operation. The anti-shake operation controls the movement of the first movable unit 30a and controls detecting the position of the first movable unit 30a.

The imaging block 22 drives the imaging unit 39a. The AE unit 23 performs the photometric operation for the photographic subject, calculates the photometric values, and calculates the aperture value and the time length of the exposure time, which is needed for imaging, corresponding to the photometric values. The AF unit 24 performs the AF sensing operation, and performs the focusing operation, which is needed for the imaging, corresponding to the result of the AF sensing operation. In the focusing operation, the position of the camera lens 67 is moved in the optical axis LX direction.

The anti-shaking part of the photographing apparatus 1 comprises an anti-shake button 14, an anti-shake switch 14a, a first CPU 21, an angular velocity detecting unit 25, a first driver circuit 29, a first anti-shake apparatus 30, a first hall-element signal-processing unit 45, and the camera lens 67.

When the anti-shake button 14 is fully pushed by the operator, the anti-shake switch 14a changes to the on state, so that the anti-shake operation is performed where the angular velocity detecting unit 25 and the first anti-shake apparatus 30 are driven, at every predetermined time interval, independently of the other operations which include the photometric operation etc.

The various output commands corresponding to the input signals of these switches are controlled by the first CPU 21.

The information regarding whether the photometric switch 12a is in the on state or in the off state, is input to port P12 of the first CPU 21 as a 1-bit digital signal.

The information regarding whether the release switch 13a is in the on state or in the off state, is input to port P13 of the first CPU 21 as a 1-bit digital signal. The information regarding whether the anti-shake switch 14a is in the on state or in the off state, is input to port P14 of the first CPU 21 as a 1-bit digital signal.

The imaging block 22 is connected to port P3 of the first CPU 21 for inputting and outputting signals. The AE unit 23 is connected to port P4 of the first CPU 21 for inputting and outputting signals. The AF unit 24 is connected to port P5 of the first CPU 21 for inputting and outputting signals.

Next, the details of the input and output relationship with the first CPU 21 for the angular velocity unit 25, the first driver circuit 29, the first anti-shake apparatus 30, and the first hall-element signal-processing unit 45, are explained.

The angular velocity unit 25 has a first angular velocity sensor 26a, a second angular velocity sensor 26b, and a combined amplifier and high-pass filter circuit 28. The first angular velocity sensor 26a detects the velocity-component in the first direction x of the angular velocity of the photographing apparatus 1, at every predetermined time interval (1 ms). The second angular velocity sensor 26b detects the velocity-component in the second direction y of the angular velocity of the photographing apparatus 1, at every predetermined time interval (1 ms).

The combined amplifier and high-pass filter circuit 28 amplifies the signal regarding the first direction x of the angular velocity (the velocity-component in the first direction x of the angular velocity), reduces a null voltage and a panning of the first angular velocity sensor 26a, and outputs the analogue signal to the A/D converter A/D 0 of the first CPU 21 as a first angular velocity vx.

The combined amplifier and high-pass filter circuit 28 amplifies the signal regarding the second direction y of the angular velocity (the velocity-component in the second direction y of the angular velocity), reduces a null voltage and a panning of the second angular velocity sensor 26b, and outputs the analogue signal to the A/D converter A/D 1 of the first CPU 21 as a second angular velocity vy.

The angular velocity unit 25 also has a third angular velocity sensor 26c. The third angular velocity sensor 26c detects the rotation-velocity-component of the angular velocity on an xy plane of the photographing apparatus 1, at every predetermined time interval (1 ms). The xy plane is a plane which is perpendicular to the third direction z.

The combined amplifier and high-pass filter circuit 28 amplifies the signal regarding the rotation-speed of the angular velocity (the rotation-velocity-component on the xy plane of the angular velocity), reduces a null voltage and a panning of the third angular velocity sensor 26c, and outputs the analogue signal to the A/D converter A/D 2 of the first CPU 21 as a third angular velocity vθ.

The first CPU 21 converts the first angular velocity vx which is input to the A/D converter A/D 0, and the second angular velocity vy which is input to the A/D converter A/D 1, and the third angular velocity vθ which is input to the A/D converter A/D 2, to digital signals (A/D converting operation), and calculates the hand-shake quantity, which occurs in the predetermined time (1 ms), on the basis of the converted digital signals and the converting coefficient, where focal distance is considered. This hand-shake quantity includes a component in the first direction x, a component in the second direction y, and a rotation-component on the xy plane. Accordingly, the first CPU 21 and the angular velocity detecting unit 25 have a function which calculates the hand-shake quantity.

The first CPU 21 calculates the position S of the imaging unit 39a (the first movable unit 30a), which should be moved to and rotated to, corresponding to the hand-shake quantity which is calculated, for the first direction x, the second direction y, and the rotation angle.

The location in the first direction x of the position S is defined as sx, and the location in the second direction y of the position S is defined as sy, and the rotation angle on the xy plane of the position S is defined as sθ. The movement of the first movable unit 30a, which includes the imaging unit 39a, is performed by using electro-magnetic force and is described later. The driving force D, which drives the first driver circuit 29 in order to move and rotate the first movable unit 30a to the position S, has a horizontal PWM duty dx as the driving-force component in the first direction x, and a first vertical PWM duty dy1 as one of the driving-force components in the second direction y, and a second vertical PWM duty dy2 as another of the driving-force components in the second direction y.

The first anti-shake apparatus 30 is an apparatus which corrects the hand-shake effect, by moving and rotating the imaging unit 39a to the position S, by canceling lag of the photographic subject image on the imaging surface of the imaging device 39a1, and by stabilizing the photographing subject image that reaches the imaging surface of the imaging device 39a1. This lag includes a rotation-component.

The first anti-shake apparatus 30 has a first movable unit 30a, which includes the imaging unit 39a, and a first fixed unit 30b. Or, the first anti-shake apparatus 30 is composed of a driving part which moves the first movable unit 30a by electromagnetic force to the position S, and a position-detecting part which detects the position of the first movable unit 30a (a detected-position P).

The size and the direction of the electro-magnetic force are determined by the size and the direction of the current which flows in the coil, and the size and the direction of the magnetic-field of the magnet.

The driving of the first movable unit 30a of the first anti-shake apparatus 30, is performed by the first driver circuit 29 which has the horizontal PWM duty dx input from the PWM 0 of the first CPU 21 and has the first vertical PWM duty dy1 input from the PWM 1 of the first CPU 21 and has the second vertical PWM duty dy2 input from the PWM 2 of the first CPU 21.

The detected-position P of the first movable unit 30a, either before moving and rotating or after moving and rotating, which is moved and rotated by driving the first driver circuit 29, is detected by the first hall element unit 44a and the first hall-element signal-processing unit 45.

Information in the first direction x for the detected-position P, in other words a horizontal detected-position signal px is input to the A/D converter A/D 3 of the first CPU 21. The horizontal detected-position signal px is an analogue signal, and is converted to a digital signal through the A/D converter A/D 3 (A/D converting operation).

Information in the second direction y for the detected-position P, in other words the first and second vertical detected-position signals py1 and py2, is input to the A/D converters A/D 4 and A/D 5 of the first CPU 21. The first vertical detected-position signal py1 is an analogue signal, and is converted to a digital signal through the A/D converter A/D 4 (A/D converting operation) The second vertical detected-position signal py2 is an analogue signal, and is converted to a digital signal through the A/D converter A/D 5 (A/D converting operation).

A data in the first direction x for the detected-position P, after the A/D converting operation, is defined as pdx, corresponding to the horizontal detected-position signal px.

A first data in the second direction y for the detected-position P, after the A/D converting operation, is defined as pdy1, corresponding to the first vertical detected-position signal py1.

A second data in the second direction y for the detected-position P, after the A/D converting operation, is defined as pdy2, corresponding to the second vertical detected-position signal py2.

A first location in the first direction x for the detected-position P, after the calculating operation for the data pdx, pdy1, and pdy2, is defined as pxx.

A second location in the second direction y for the detected-position P, after the calculating operation for the data pdx, pdy1, and pdy2, is defined as pyy.

A rotation angle on the xy plane for the detected-position P, after the calculating operation for the data pdx, pdy1, and pdy2, is defined as p$\theta$.

The PID (Proportional Integral Differential) control is performed on the basis of the data for the detected-position P (pxx, pyy, p$\theta$) and the data for the position S (sx, sy, s$\theta$) which should be moved to and rotated to.

The first movable unit 30a has a first vertical driving coil 31a1, a second vertical driving coil 31a2, a horizontal driving coil 32a, an imaging unit 39a, a first hall element unit 44a, a first movable circuit board 49a, a first ball for movement 50a1, a second ball for movement 50a2, a third ball for movement 50a3, a first ball-bearing for movement 51a, a second ball-bearing for movement 52a, a third ball-bearing for movement 53a, and a plate 64a (see FIGS. 4 and 5).

The first fixed unit 30b has a first vertical position-detecting and driving magnet 33b1, a second vertical position-detecting and driving magnet 33b2, a horizontal position-detecting and driving magnet 34b, a first vertical position-detecting and driving yoke 35b1, a second vertical position-detecting and driving yoke 35b2, a horizontal position-detecting and driving yoke 36b, a first hall element unit 44a, and a first base board 65b.

The first movable unit 30a contacts the first fixed unit 30b, through the first, second, and third balls 50a1, 50a2, and 50a3. The first ball for movement 50a1 can roll between the first ball-bearing for movement 51a and the first base board 65b. The second ball for movement 50a2 can roll between the second ball-bearing for movement 52a and the first base board 65b. The third ball for movement 50a3 can roll between the third ball-bearing for movement 53a and the first base board 65b.

The contacted situation of the first movable unit 30a and the first fixed unit 30b is kept through the first, second, and third balls 50a1, 50a2, and 50a3.

The first movable unit 30a is urged in the third direction z, by an urging member such as a spring etc., which is fixed in the photographing apparatus 1. Therefore, the movable and rotatable situation of the first movable unit 30a on the xy plane is maintained. Or, the first fixed unit 30b supports the first movable unit 30a in the movable and rotatable situation.

When the center area of the imaging device 39a1 is located on the optical axis LX of the camera lens 67, the location relation between the first movable unit 30a and the first fixed unit 30b is set up so that the first movable unit 30a is located at the center of its movement range in both the first direction x and the second direction y, in order to utilize the full size of the imaging range of the imaging device 39a1.

A rectangle shape, which forms the imaging surface (the valid pixel area) of the imaging device 39a1, has two diagonal lines. In the first embodiment, the center of the imaging device 39a1 is the crossing point of these two diagonal lines.

Four segments of the rectangular shape are parallel to the first direction x or the second direction y, before the first movable unit 30a is rotated.

In the first embodiment, the center of the imaging device 39a1 agrees with the center of gravity of the rectangle shape of the valid pixel area. Accordingly, when the first movable unit 30a is located at the center of its movement range, the center of gravity of the rectangle shape of the valid pixel area is located on the optical axis LX of the camera lens 67.

The imaging unit 39a, the plate 64a, and the first movable circuit board 49a are attached, in this order along the optical axis LX direction, viewed from the side of the camera lens 67. The imaging unit 39a has an imaging device 39a1 (such as a CCD or a COMS etc.), a stage 39a2, a holding unit 39a3, and an optical low-pass filter 39a4. The stage 39a2 and the plate 64a hold and urge the imaging device 39a1, the holding unit 39a3, and the optical low-pass filter 39a4 in the optical axis LX direction.

The first, second, and third ball-bearings 51a, 52a, and 53a are attached to the stage 39a2. The imaging device 39a1 is attached to the plate 64a, so that positioning of the imaging device 39a1 is performed where the imaging device 39a1 is perpendicular to the optical axis LX of the camera lens 67. In the case where the plate 64a is made of a metallic material, the plate 64a has the effect of radiating heat from the imaging device 39a1, by contacting the imaging device 39a1.

The first vertical driving coil 31a1, the second vertical driving coil 31a2, and the horizontal driving coil 32a, are attached to the first movable circuit board 49a.

The first vertical driving coil 31a1 forms a seat and a spiral shape coil pattern. The coil pattern of the first vertical driving coil 31a1 has a line segment which is parallel to the first direction x, before the first movable unit 30a is rotated. The first movable unit 30a which includes the first vertical driving coil 31a1, is moved in the second direction y, by the first electro-magnetic force Pw1. The line segment which is parallel to the first direction x, is used for moving the first movable unit 30a in the second direction y. The line segment which is parallel to the first direction x, has a first effective length L1.

The first electromagnetic force Pw1 occurs on the basis of the current direction of the first vertical driving coil 31a1 and the magnetic-field direction of the first vertical position-detecting and driving magnet 33b1.

The second vertical driving coil 31a2 forms a seat and a spiral shape coil pattern. The coil pattern of the second vertical driving coil 31a2 has a line segment which is parallel to the first direction x, before the first movable unit 30a is rotated. The first movable unit 30a which includes the second vertical driving coil 31a2, is moved in the second direction y, by the second electro-magnetic force Pw2. The line segment which is parallel to the first direction x, is used for moving the first movable unit 30a in the second direction y. The line segment which is parallel to the first direction x, has a second effective length L2.

The second electro-magnetic force Pw2 occurs on the basis of the current direction of the second vertical driving coil 31a2 and the magnetic-field direction of the second vertical position-detecting and driving magnet 33b2.

In the first embodiment, the first vertical driving coil 31a1 is attached to the right edge area of the first movable circuit board 49a (one of the edge areas of the first movable circuit board 49a in the first direction x), viewed from the third direction z and from the opposite side of the camera lens 67.

Similarly, the second vertical driving coil 31a2 is attached to the left edge area of the first movable circuit board 49a (another of the edge areas of the first movable circuit board 49a in the first direction x), viewed from the third direction z and from the opposite side of the camera lens 67.

Similarly, the horizontal driving coil 32a is attached to the upper area of the first movable circuit board 49a (one of the edge areas of the first movable circuit board 49a in the second direction y), viewed from the third direction z and from the opposite side of the camera lens 67.

The imaging device 39a1 is attached to the middle area of the first movable circuit board 49a between the first and second vertical driving coils 31a1 and 31a2, in the first direction x.

The first and second vertical driving coils 31a1 and 31a2 and the horizontal driving coil 32a, and the imaging device 39a1 are attached on the same side of the first movable circuit board 49a.

The location relation between the first and second vertical driving coils 31a1 and 31a2 is set up so that the optical axis LX is located between the first and second vertical driving coils 31a1 and 31a2 in the first direction x, before the first movable unit 30a is rotated. In other words, the first and second vertical driving coils 31a1 and 31a2 are arranged in a symmetric position centering on the optical axis LX. A point which receives the first electro-magnetic force Pw1 and a point which receives the second electromagnetic force Pw2 are on a line which is parallel to the first direction x.

Therefore, the first movable unit 30a can be rotated around an intersection area between the xy plane and the optical axis LX, in other words a center area of the imaging device 39a1, by the first and second electro-magnetic forces Pw1 and Pw2. Further, even if the direction of the first electromagnetic force Pw1 is opposite to or the same as the direction of the second electro-magnetic force Pw2, when the quantity of the first electro-magnetic force Pw1 is different from the quantity of the second electromagnetic force Pw2, the first movable unit 30a can be rotated.

The first and second vertical driving coils 31a1 and 31a2 are arranged on the first movable circuit board 49a, where a distance between the center of the imaging device 39a1 and the center area of the first vertical driving coil 31a1 is the same as a distance between the center of the imaging device 39a1 and the center area of the second vertical driving coil 31a2.

The horizontal driving coil 32a forms a seat and a spiral shape coil pattern. The coil pattern of the horizontal driving coil 32a has a line segment which is parallel to the second direction y, before the first movable unit 30a is rotated. The first movable unit 30a which includes the horizontal driving coil 32a, is moved in the first direction x, by the third electro-magnetic force Pw3. The line segment which is parallel to the second direction y, is used for moving the first movable unit 30a in the first direction x. The line segment which is parallel to the second direction y, has a third effective length L3.

The third electro-magnetic force Pw3 occurs on the basis of the current direction of the horizontal driving coil 32a and the magnetic-field direction of the horizontal position-detecting and driving magnet 34b.

Because the two coils (31a1 and 31a2) are used for moving the first movable unit 30a in the second direction y and because the first movable unit 30a is movable and rotatable on the xy plane relative to the first fixed unit 30b by the first, second, and third balls 50a1, 50a2, and 50a3, the first movable unit 30a can be moved and rotated on the xy plane by the first and second vertical driving coils 31a1 and 31a2 and the horizontal driving coil 32a, relative to the first fixed unit 30b.

Further, because the horizontal driving coil 32a and the first and second vertical driving coils 31a1 and 31a2 are seat coils, the thickness of each coil in the third direction z can be small. Accordingly, even if the horizontal driving coil 32a and the first and second vertical driving coils 31a1 and 31a2 are composed of a plurality of seat coils which are layered in the third direction z, for increasing the electro-magnetic force, the thickness of each coil in the third direction z hardly increases. Therefore, the first anti-shake apparatus 30 can be downsized by restraining the distance between the first movable unit 30a and the first fixed unit 30b.

The first and second vertical driving coils 31a1 and 31a2 and the horizontal driving coil 32a are connected with the first driver circuit 29 which drives the first and second vertical driving coils 31a1 and 31a2 and the horizontal driving coil 32a through the flexible circuit board (not depicted). The horizontal PWM duty dx is input to the first driver circuit 29 from the PWM 0 of the first CPU 21, and the first vertical PWM duty dy1 is input to the first driver circuit 29 from the PWM 1 of the first CPU 21, and the second vertical PWM duty dy2 is input to the first driver circuit 29 from the PWM 2 of the first CPU 21. The first driver circuit 29 supplies power to the horizontal driving coil 32a corresponding to the value of the horizontal PWM duty dx, and to the first vertical driving coil 31a1 corresponding to the value of the first vertical PWM duty dy1, and to the second vertical driving coil 31a2 corresponding to the value of the second vertical PWM duty dy2, to drive (move and rotate) the first movable unit 30a.

When the first movable unit 30a is moved in the second direction y, the first CPU 21 controls the values of the first and second vertical PWM duties dy1 and dy2 where the direction of the first electro-magnetic force Pw1 is the same as the direction of the second electro-magnetic force Pw2 and where the quantity of the first electro-magnetic force Pw1 is the same as the quantity of the second electro-magnetic force Pw2.

When the first movable unit 30a is rotated on the xy plane, the first CPU 21 controls the values of the first and second vertical PWM duties dy1 and dy2 where the direction of the first electromagnetic force Pw1 is opposite to the direction of the second electro-magnetic force Pw2 and where the quantity of the first electro-magnetic force Pw1 is the same as the quantity of the second electro-magnetic force Pw2.

When the first movable unit 30a is moved in the second direction y and rotated on the xy plane, the first CPU 21 controls the values of the first and second vertical PWM duties dy1 and dy2 where the direction of the first electromagnetic force Pw1 is the same as the direction of the second electro-magnetic force Pw2 and where the quantity of the first electro-magnetic force Pw1 is different from the quantity of the second electro-magnetic force Pw2.

The first vertical position-detecting and driving magnet 33b1 is attached to the movable unit side of the first fixed unit 30b, where the first vertical position-detecting and driving magnet 33b1 faces the first vertical driving coil 31a1 and the first vertical hall element hv1 in the third direction z.

The second vertical position-detecting and driving magnet 33b2 is attached to the movable unit side of the first fixed unit 30b, where the second vertical position-detecting and driving magnet 33b2 faces the second vertical driving coil 31a2 and the second vertical hall element hv2 in the third direction z.

The horizontal position-detecting and driving magnet 34b is attached to the movable unit side of the first fixed unit 30b, where the horizontal position-detecting and driving magnet 34b faces the horizontal driving coil 32a and the horizontal hall element hh10 in the third direction z.

The first vertical position-detecting and driving magnet 33b1 is attached to the first vertical position-detecting and driving yoke 35b1, under the condition where the N pole and S pole are arranged in the second direction y. The first vertical position-detecting and driving yoke 35b1 is attached to the first base board 65b of the first fixed unit 30b, on the side of the first movable unit 30a, in the third direction z.

The length of the first vertical position-detecting and driving magnet 33b1 in the first direction x, is longer in comparison with the first effective length L1 of the first vertical driving coil 31a1. The magnetic-field which influences the first vertical driving coil 31a1 and the first vertical hall element hv1, is not changed during movement of the first movable unit 30a in the first direction x.

The second vertical position-detecting and driving magnet 33b2 is attached to the second vertical position-detecting and driving yoke 35b2, under the condition where the N pole and S pole are arranged in the second direction y. The second vertical position-detecting and driving yoke 35b2 is attached to the first base board 65b of the first fixed unit 30b, on the side of the first movable unit 30a, in the third direction z.

The length of the second vertical position-detecting and driving magnet 33b2 in the first direction x, is longer in comparison with the second effective length L2 of the second vertical driving coil 31a2. The magnetic-field which influences the second vertical driving coil 31a2 and the second vertical hall element hv2, is not change during movement of the first movable unit 30a in the first direction x.

The horizontal position-detecting and driving magnet 34b is attached to the horizontal position-detecting and driving yoke 36b, under the condition where the N pole and S pole are arranged in the first direction x. The horizontal position-detecting and driving yoke 36b is attached to the first base board 65b of the first fixed unit 30b, on the side of the first movable unit 30a, in the third direction z.

The length of the horizontal position-detecting and driving magnet 34b in the second direction y, is longer in comparison with the third effective length L3 of the horizontal driving coil 32a. The magnetic-field which influences the horizontal driving coil 32a and the horizontal hall element hh10, is not changed during movement of the first movable unit 30a in the second direction y.

The first vertical position-detecting and driving yoke 35b1 is made of a soft magnetic material, and forms a square-u-shape channel when viewed from the first direction x. The first vertical position-detecting and driving magnet 33b1, the first vertical driving coil 31a1, and the first vertical hall element hv1, are inside the channel of the first vertical position-detecting and driving yoke 35b1.

The side of the first vertical position-detecting and driving yoke 35b1, which contacts the first vertical position-detecting and driving magnet 33b1, prevents the magnetic-field of the first vertical position-detecting and driving magnet 33b1 from leaking to the surroundings.

The other side of the first vertical position-detecting and driving yoke 35b1 (which faces the first vertical position-detecting and driving magnet 33b1, the first vertical driving coil 31a1, and the first movable circuit board 49a) raises the magnetic-flux density between the first vertical position-detecting and driving magnet 33b1 and the first vertical driving coil 31a1, and between the first vertical position-detecting and driving magnet 33b1 and the first vertical hall element hv1.

The second vertical position-detecting and driving yoke 35b2 is made of a soft magnetic material, and forms a square-u-shape channel when viewed from the first direction x. The second vertical position-detecting and driving magnet 33b2, the second vertical driving coil 31a2, and the second vertical hall element hv2, are inside the channel of the second vertical position-detecting and driving yoke 35b2.

The side of the second vertical position-detecting and driving yoke 35b2, which contacts the second vertical position-detecting and driving magnet 33b2, prevents the magnetic-field of the second vertical position-detecting and driving magnet 33b2 from leaking to the surroundings.

The other side of the second vertical position-detecting and driving yoke 35b2 (which faces the second vertical position-detecting and driving magnet 33b2, the second vertical driving coil 31a2, and the first movable circuit board 49a) raises the magnetic-flux density between the second vertical position-detecting and driving magnet 33b2 and the second vertical driving coil 31a2, and between the second vertical position-detecting and driving magnet 33b2 and the second vertical hall element hv2.

The horizontal position-detecting and driving yoke 36b is made of a soft magnetic material, and forms a square-u-shape channel when viewed from the first direction x. The horizontal position-detecting and driving magnet 34b, the horizontal driving coil 32a, and the horizontal hall element hh10, are inside the channel of the horizontal position-detecting and driving yoke 36b.

The side of the horizontal position-detecting and driving yoke 36b, which contacts the horizontal position-detecting and driving magnet 34b, prevents the magnetic-field of the horizontal position-detecting and driving magnet 34b from leaking to the surroundings.

The other side of the horizontal position-detecting and driving yoke 36b (which faces the horizontal position-detecting and driving magnet 34b, the horizontal driving coil 32a, and the first movable circuit board 49a) raises the magnetic-flux density between the horizontal position-detecting and driving magnet 34b and the horizontal driving coil 32a, and between the horizontal position-detecting and driving magnet 34b and the horizontal hall element hh10.

The first hall element unit 44a is a one-axis hall element which has three hall elements that are magnetoelectric converting elements (magnetic-field change-detecting elements) using the Hall Effect. The first hall element unit 44a detects the horizontal detected-position signal px, and the first vertical detected-position signal py1, and the second vertical detected-position signal py2.

One of the three hall elements is a horizontal hall element hh10 for detecting the horizontal detected-position signal px, and one of three hall elements is a first vertical hall element hv1 for detecting the first vertical detected-position signal py1, so that the other is a second vertical hall element hv2 for detecting the second vertical detected-position signal py2 (see FIG. 4).

The horizontal hall element hh10 may be arranged outside the spiral shape of the winding of the horizontal driving coil 32a in the second direction y. However, it is desirable that the horizontal hall element hh10 is arranged inside the spiral shape of the winding of the horizontal driving coil 32a, and is arranged midway along an outer circumference of the spiral shape of the winding of the horizontal driving coil 32a in the first direction x.

The horizontal hall element hh10 is layered on the horizontal driving coil 32a in the third direction z. Accordingly, an area in which the magnetic-field is generated for the position-detecting operation and an area in which the magnetic-field is generated for driving the first movable unit 30a are shared. Therefore, the length of the horizontal position-detecting and driving magnet 34b and the length of the horizontal position-detecting and driving yoke 36b can be shortened.

The first vertical hall element hv1 may be arranged outside the spiral shape of the winding of the first vertical driving coil 31a1 in the first direction x. However, it is desirable that the first vertical hall element hv1 is arranged inside the spiral shape of the winding of the first vertical driving coil 31a1, and is arranged midway along an outer circumference of the spiral shape of the winding of the first vertical driving coil 31a1 in the second direction y.

The first vertical hall element hv1 is layered on the first vertical driving coil 31a1 in the third direction z. Accordingly, an area in which the magnetic-field is generated for the position-detecting operation and an area in which the magnetic-field is generated for driving the first movable unit 30a are shared. Therefore, the length of the first vertical position-detecting and driving magnet 33b1 and the length of the first vertical position-detecting and driving yoke 35b1 can be shortened.

The second vertical hall element hv2 may be arranged outside the spiral shape of the winding of the second vertical driving coil 31a2 in the first direction x. However, it is desirable that the second vertical hall element hv2 is arranged inside the spiral shape of the winding of the second vertical driving coil 31a2, and is arranged midway along an outer circumference of the spiral shape of the winding of the second vertical driving coil 31a2 in the second direction y.

The second vertical hall element hv2 is layered on the second vertical driving coil 31a2 in the third direction z. Accordingly, an area in which the magnetic-field is generated for the position-detecting operation and an area in which the magnetic-field is generated for driving the first movable unit 30a are shared. Therefore, the length of the second vertical position-detecting and driving magnet 33b2 and the length of the second vertical position-detecting and driving yoke 35b2 can be shortened.

When the center of the imaging device 39a1, passes through the optical axis LX before the first movable unit 30a is rotated, it is desirable that the horizontal hall element hh10 is located at a place on the first hall element unit 44a which faces an intermediate area between the N pole and S pole of the horizontal position-detecting and driving magnet 34b in the first direction x, viewed from the third direction z, to perform the position-detecting operation utilizing the full size of the range where an accurate position-detecting operation can be performed based on the linear output-change (linearity) of the one-axis hall element.

Similarly, when the center of the imaging device 39a1, passes through the optical axis LX before the first movable unit 30a is rotated, it is desirable that the first vertical hall element hv1 is located at a place on the first hall element unit 44a which faces an intermediate area between the N pole and S pole of the first vertical position-detecting and driving magnet 33b1 in the second direction y, viewed from the third direction z.

Similarly, when the center of the imaging device 39a1, passes through the optical axis LX before the first movable unit 30a is rotated, it is desirable that the second vertical hall element hv2 is located at a place on the first hall element unit 44a which faces an intermediate area between the N pole and S pole of the second vertical position-detecting and driving magnet 33b2 in the second direction y, viewed from the third direction z.

The first base board 65b is a plate state member which becomes the base for attaching the horizontal position-detecting and driving yoke 36b etc., and is arranged being parallel to the imaging surface of the imaging device 39a1.

In the first embodiment, the first base board 65b is arranged at the side nearer to the camera lens 67 in comparison with the first movable circuit board 49a, in the third direction z. However, the first movable circuit board 49a may be arranged at the side nearer to the camera lens 67 in comparison with the first base board 65b. In this case, the first and second vertical driving coils 31a1 and 31a2 and the horizontal driving coil 32a are arranged on the opposite side of the first movable circuit board 49a to the camera lens 67, so that the first and second vertical position-detecting and driving magnets 33b1 and 33b2 and the horizontal position-detecting and driving magnet 34b are arranged on the same side of the first movable circuit board 49a as the camera lens 67.

The first hall-element signal-processing unit 45 has a first hall-element signal-processing circuit 451 and a second hall-element signal-processing circuit 452 and a third hall-element signal-processing circuit 453.

The first hall-element signal-processing circuit 451 detects a horizontal potential-difference (as first position-information) between the output terminals of the horizontal hall element hh10, based on an output signal of the horizontal hall element hh10.

The first hall-element signal-processing circuit 451 outputs the horizontal detected-position signal px to the A/D converter A/D 3 of the first CPU 21, on the basis of the horizontal potential-difference. The horizontal detected-position signal px specifies a location of the part of the first movable unit 30a which has the horizontal hall element hh10 (the point A of FIG. 6), in the first direction x.

The first hall-element signal-processing circuit 451 is connected with the horizontal hall element hh10 through the flexible circuit board (not depicted).

The second hall-element signal-processing circuit 452 detects a first vertical potential-difference (as one part of the second position-information) between the output terminals of the first vertical hall element hv1, based on an output signal of the first vertical hall element hv1.

The second hall-element signal-processing circuit 452 outputs the first vertical detected-position signal py1 to the A/D converter A/D 4 of the first CPU 21, on the basis of the first vertical potential-difference. The first vertical detected-position signal py1 specifies a location of the part of the first movable unit 30a which has the first vertical hall element hv1 (the point B of FIG. 6), in the second direction y.

The second hall-element signal-processing circuit 452 is connected with the first vertical hall element hv1 through the flexible circuit board (not depicted).

The third hall-element signal-processing circuit 453 detects a second vertical potential-difference (as one part of the second position-information) between the output terminals of the second vertical hall element hv2, based on an output signal of the second vertical hall element hv2.

The third hall-element signal-processing circuit 453 outputs the second vertical detected-position signal py2 to the A/D converter A/D 5 of the first CPU 21, on the basis of the second vertical potential-difference. The second vertical detected-position signal py2 specifies a location of the part of the first movable unit 30a which has the second vertical hall element hv2 (the point C of FIG. 6), in the second direction y.

The third hall-element signal-processing circuit 453 is connected with the second vertical hall element hv2 through the flexible circuit board (not depicted).

In the first embodiment, the three hall elements (hh10, hv1 and hv2) are used for specifying the location of the first movable unit 30a which includes the rotation angle.

By using two of the three hall elements (hv1 and hv2), the locations in the second direction y of the two points (the points B and C) on the first movable unit 30a are specified. By using another of the three hall elements (hh10), the location in the first direction x of the one point (the point A) on the first movable unit 30a is specified. The location of the first movable unit 30a which includes the rotation angle on the xy plane, can be specified on the basis of the information regarding the locations in the first direction x of the one point (A) and the location in the second direction y of the two points (B and C).

Figure 6:
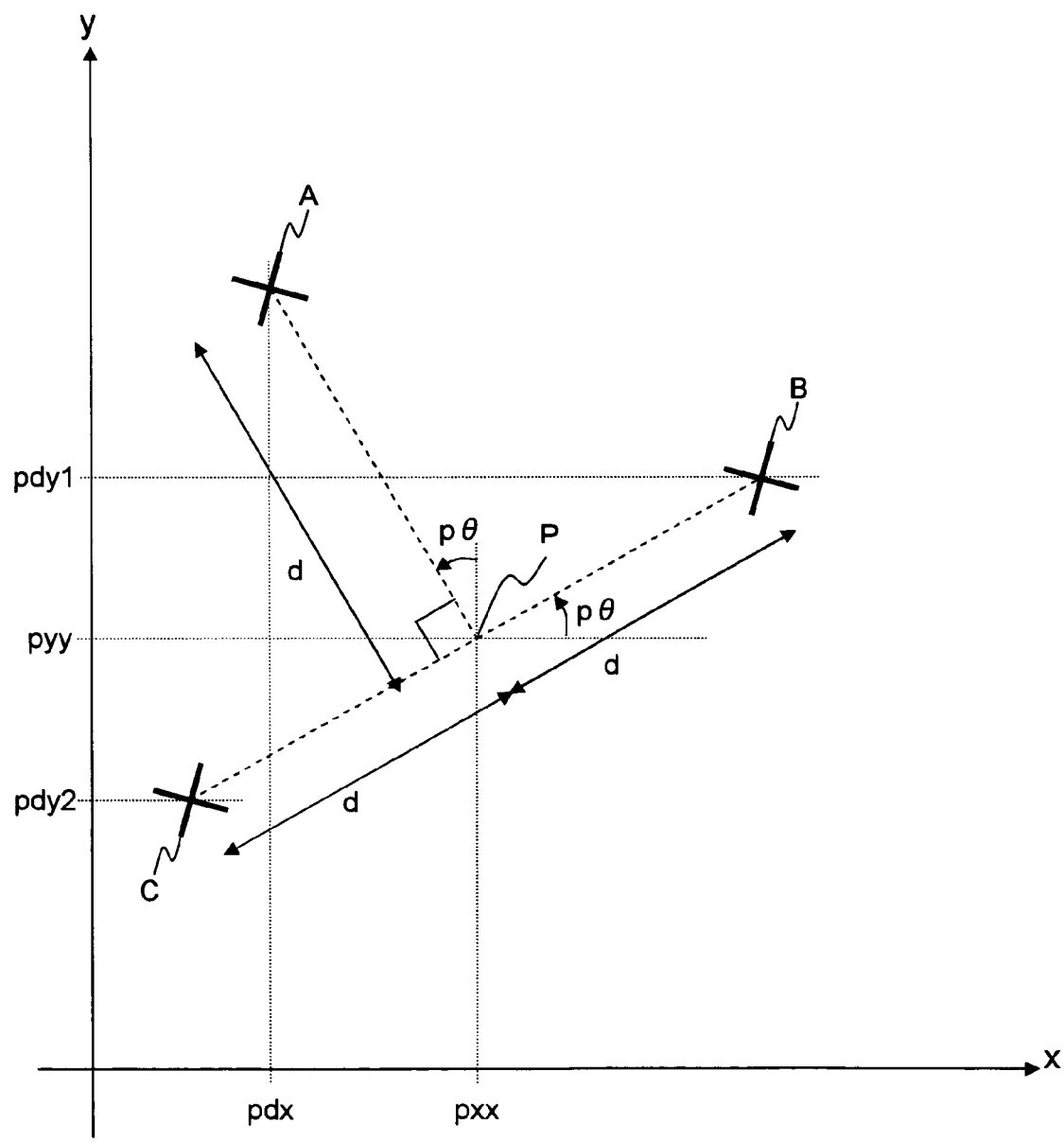
FIG. 6 is an example where the location of the point P is calculated on the basis of location-information of a point A, a point B, and a point C on the movable unit, in the first embodiment.

An example is explained using FIG. 6. The location of the point P (pxx, pyy, pθ) is calculated on the basis of the location-information of a point A, a point B, and a point C on the first movable unit 30a.

The point A is a point where the horizontal hall element hh10 is arranged on the first movable unit 30a. The point B is a point where the first vertical hall element hv1 is arranged on the first movable unit 30a. The point C is a point where the second vertical hall element hv2 is arranged on the first movable unit 30a.

The point P is defined as an intersection point between a segment BC and a line which passes through the point A and which is perpendicular to the segment BC.

The horizontal hall element hh10, the first and second vertical hall elements hv1 and hv2, and the imaging device 39a1, are arranged on the first movable unit 30a, where the point P agrees with the center of the imaging device 39a1 in the third direction z. In the first embodiment, the location relation of the each part of the first movable unit 30a and the first fixed unit 30b is set where the point P agrees with an intermediate point of the segment BC, and where the lengths of the segment AP the segment BP and the segment CP are the same.

The location in the first direction x of the point A is detected by the horizontal hall element hh10, as the horizontal detected-position signal px. The location in the second direction y of the point B is detected by the first vertical hall element hv1, as the first vertical detected-position signal py1. The location in the second direction y of the point C is detected by the second vertical hall element hv2, as the second vertical detected-position signal py2.

The data for the position P (pxx, pyy, pθ) are calculated on the basis of the data pdx which is converted from the horizontal detected-position signal px in the A/D converting operation, the data pdy1 which is converted from the first vertical detected-position signal py1 in the A/D converting operation, and the data pdy2 which is converted from the second vertical detected-position signal py2 in the A/D converting operation, a segment AP having length d, a segment BP having length d, and a segment CP having length d, where pxx=pdx+d×sin(pθ), pyy=(pdy1+pdy2)÷2, and pθ=Sin$^{-1}${(pdy1−pdy2)÷2d}. The rotation angle pθ is an angle between the segment BP and the first direction x or between the segment AP and the second direction y.

In the first embodiment, the first hall element unit 44a has two hall elements for detecting the location in the second direction y, and one hall element for detecting the location in the first direction x. However, the first hall element unit 44a may have one hall element for detecting the location in the second direction y, and two hall elements for detecting the location in the first direction x.

Next, the second embodiment is explained. In the second embodiment, constructions of the driving coil, the position-detecting and driving magnet, the position-detecting and driving yoke, the hall element unit, and the hall-element signal-processing unit are different from those of the first embodiment (see FIGS. 7 to 10).

Therefore, the second embodiment is explained centering on the constructions of the photographing apparatus 1 in the second embodiment which are different from the constructions of the photographing apparatus 1 in the first embodiment. FIG. 9 shows a construction diagram of the section along line b-b of FIG. 8. In the second embodiment, the parts that are the same as those of the first embodiment have the same sign.

Figure 7:
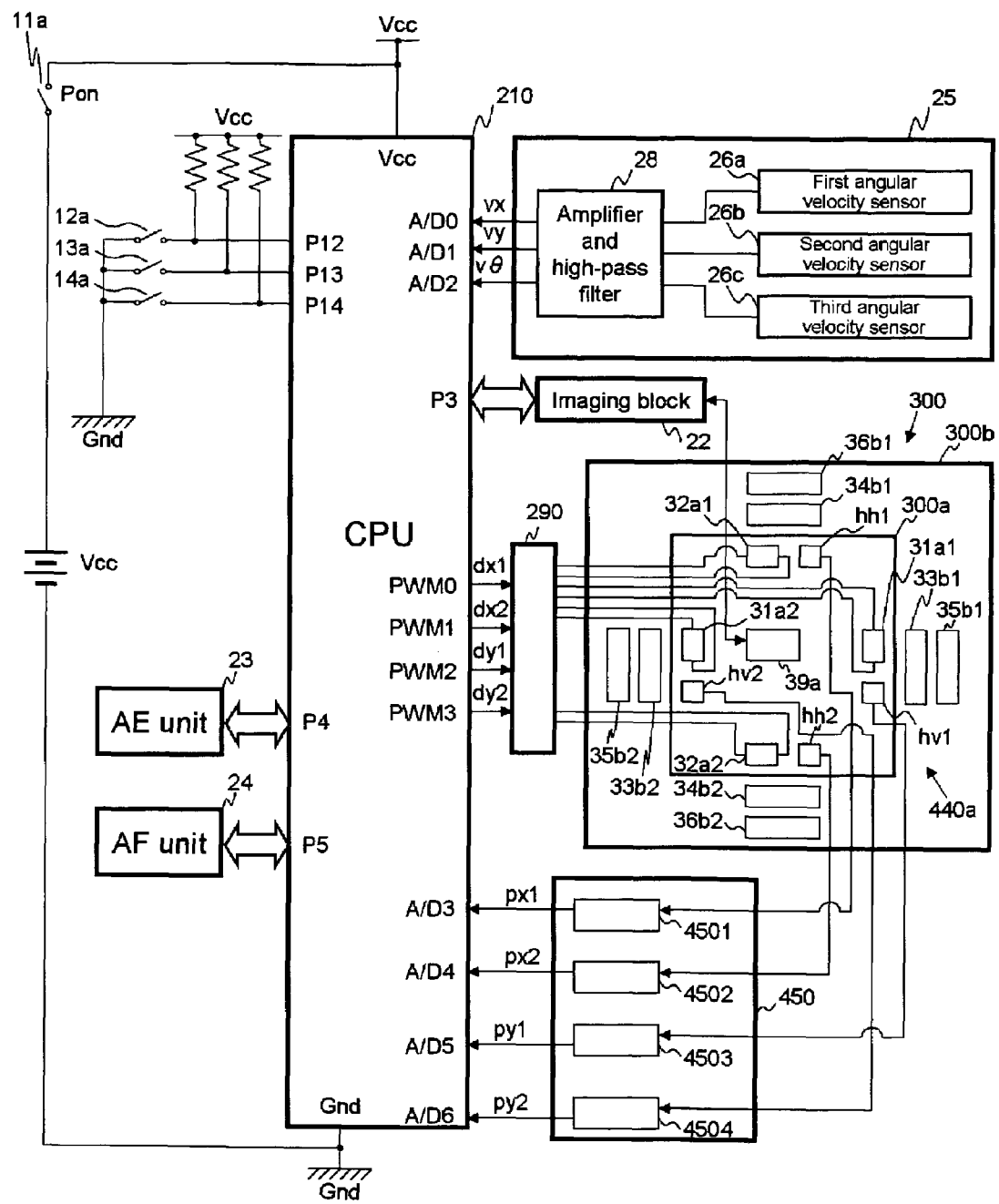
FIG. 7 is a circuit construction diagram of the photographing apparatus, in the second embodiment.

The imaging part of the photographing apparatus 1 comprises a Pon button 11, a Pon switch 11a, a photometric switch 12a, a release button 13, a release switch 13a, an indicating unit 17 such as an LCD monitor etc., a second CPU 210, an imaging block 22, an AE (automatic exposure) unit 23, an AF (automatic focusing) unit 24, an imaging unit 39a in the second anti-shake apparatus 300, and a camera lens 67 (see FIGS. 1, 2, and 7).

The second CPU 210 is a control apparatus, which controls each part of the photographing apparatus 1 regarding the imaging operation, and controls each part of the photographing apparatus 1 regarding the anti-shake operation. The anti-shake operation controls the movement of the second movable unit 300a and controls detecting the position of the second movable unit 300a.

The anti-shaking part of the photographing apparatus 1 comprises an anti-shake button 14, an anti-shake switch 14a, a second CPU 210, an angular velocity detecting unit 25, a second driver circuit 290, a second anti-shake apparatus 300, a second hall-element signal-processing unit 450, and the camera lens 67.

Next, the details of the input and output relationship with the second CPU 210 for the angular velocity unit 25, the second driver circuit 290, the second anti-shake apparatus 300, and the second hall-element signal-processing unit 450, are explained.

The angular velocity unit 25 outputs the first, second, and third angular velocities vx, vy, and vθ, to the A/D converters A/D 0, A/D 1, and A/D 2 of the second CPU 210, like the first embodiment. The second CPU 210 calculates the hand-shake quantity on the basis of the first, second, and third angular velocities vx, vy, and vθ.

The second CPU 210 calculates the position S of the imaging unit 39a (the second movable unit 300a), which should be moved to and rotated to, corresponding to the hand-shake quantity which is calculated, for the first direction x, the second direction y, and the rotation angle.

The location in the first direction x of the position S is defined as sx, and the location in the second direction y of the position S is defined as sy, and the rotation angle on the xy plane of the position S is defined as sθ. The movement of the second movable unit 300a, which includes the imaging unit 39a, is performed by using electro-magnetic force and is described later. The driving force D, which drives the second driver circuit 290 in order to move and rotate the second movable unit 300a to the position S, has a first horizontal PWM duty dx1 as one of the driving-force components in the first direction x, a second horizontal PWM duty dx2 as another of the driving-force components in the first direction x, a first vertical PWM duty dy1 as one of the driving-force components in the second direction y, and a second vertical PWM duty dy2 as another of the driving-force components in the second direction y.

The second anti-shake apparatus 300 is an apparatus which corrects the hand-shake effect, by moving and rotating the imaging unit 39a to the position S, by canceling lag of the photographic subject image on the imaging surface of the imaging device 39a1, and by stabilizing the photographing subject image that reaches the imaging surface of the imaging device 39a1. This lag includes a rotation-component.

The second anti-shake apparatus 300 has a second movable unit 300a, which includes the imaging unit 39a, and a second fixed unit 300b. Or, the second anti-shake apparatus 300 is composed of a driving part which moves the second movable unit 300a by electro-magnetic force to the position S, and a position-detecting part which detects the position of the second movable unit 300a (a detected-position P).

The size and the direction of the electro-magnetic force are determined by the size and the direction of the current which flows in the coil, and the size and the direction of the magnetic-field of the magnet.

The driving of the second movable unit 300a of the second anti-shake apparatus 300, is performed by the second driver circuit 290 which has the first horizontal PWM duty dx1 input from the PWM 0 of the second CPU 210 and has the second horizontal PWM duty dx2 input from the PWM 1 of the second CPU 210 and has the first vertical PWM duty dy1 input from the PWM 2 of the second CPU 210 and has the second vertical PWM duty dy2 input from the PWM 3 of the second CPU 210.

The detected-position P of the second movable unit 300a, either before moving and rotating or after moving and rotating, which is moved and rotated by driving the second driver circuit 290, is detected by the second hall element unit 440a and the second hall-element signal-processing unit 450.

Information in the first direction x for the detected-position P, in other words first and second horizontal detected-position signals px1 and px2 are input to the A/D converters A/D 3 and A/D 4 of the second CPU 210. The first horizontal detected-position signal px1 is an analogue signal, and is converted to a digital signal through the A/D converter A/D 3 (A/D converting operation). The second horizontal detected-position signal px2 is an analogue signal, and is converted to a digital signal through the A/D converter A/D 4 (A/D converting operation).

Information in the second direction y for the detected-position P, in other words first and second vertical detected-position signals py1 and py2 are input to the A/D converters A/D 5 and A/D 6 of the second CPU 210. The first vertical detected-position signal py1 is an analogue signal, and is converted to a digital signal through the A/D converter A/D 5 (A/D converting operation). The second vertical detected-position signal py2 is an analogue signal, and is converted to a digital signal through the A/D converter A/D 6 (A/D converting operation).

A first data in the first direction x for the detected-position P, after the A/D converting operation, is defined as pdx1, corresponding to the first horizontal detected-position signal px1.

A second data in the first direction x for the detected-position P, after the A/D converting operation, is defined as pdx2, corresponding to the second horizontal detected-position signal px2.

A first data in the second direction y for the detected-position P, after the A/D converting operation, is defined as pdy1, corresponding to the first vertical detected-position signal py1.

A second data in the second direction y for the detected-position P, after the A/D converting operation, is defined as pdy2, corresponding to the second vertical detected-position signal py2.

A first location in the first direction x for the detected-position P, after the calculating operation for the data pdx1, pdx2, pdy1, and pdy2, is defined as pxx.

A second location in the second direction y for the detected-position P, after the calculating operation for the data pdx1, pdx2, pdy1, and pdy2, is defined as pyy.

A rotation angle on the xy plane for the detected-position P, after the calculating operation for the data pdx1, pdx2, pdy1, and pdy2, is defined as pθ.

The PID (Proportional Integral Differential) control is performed on the basis of the data for the detected-position P (pxx, pyy, pθ) and the data for the position S (sx, sy, sθ) which should be moved to and rotated to.

Figure 8:
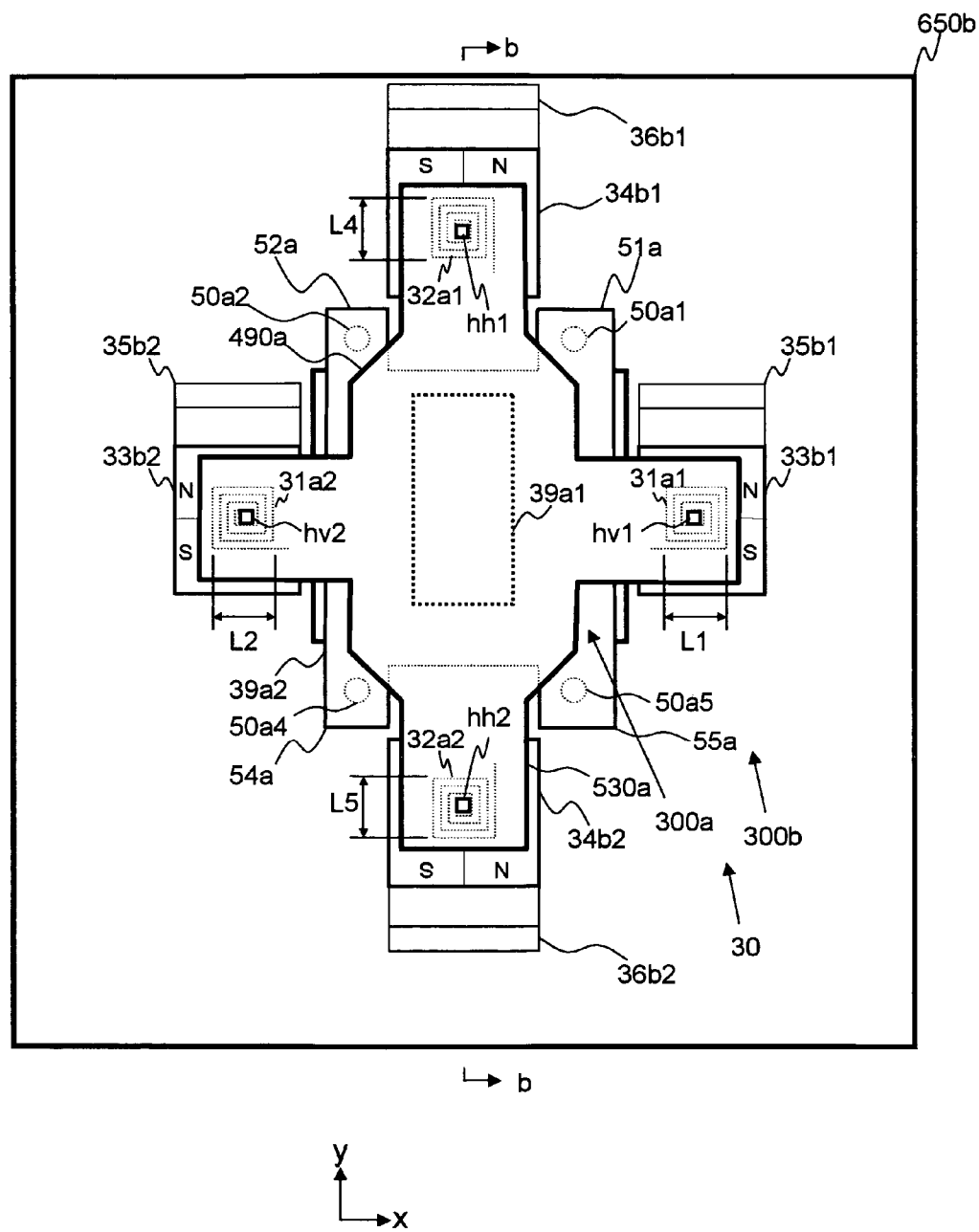
FIG. 8 is a figure showing the construction of the anti-shake unit, in the second embodiment.
Figure 9:
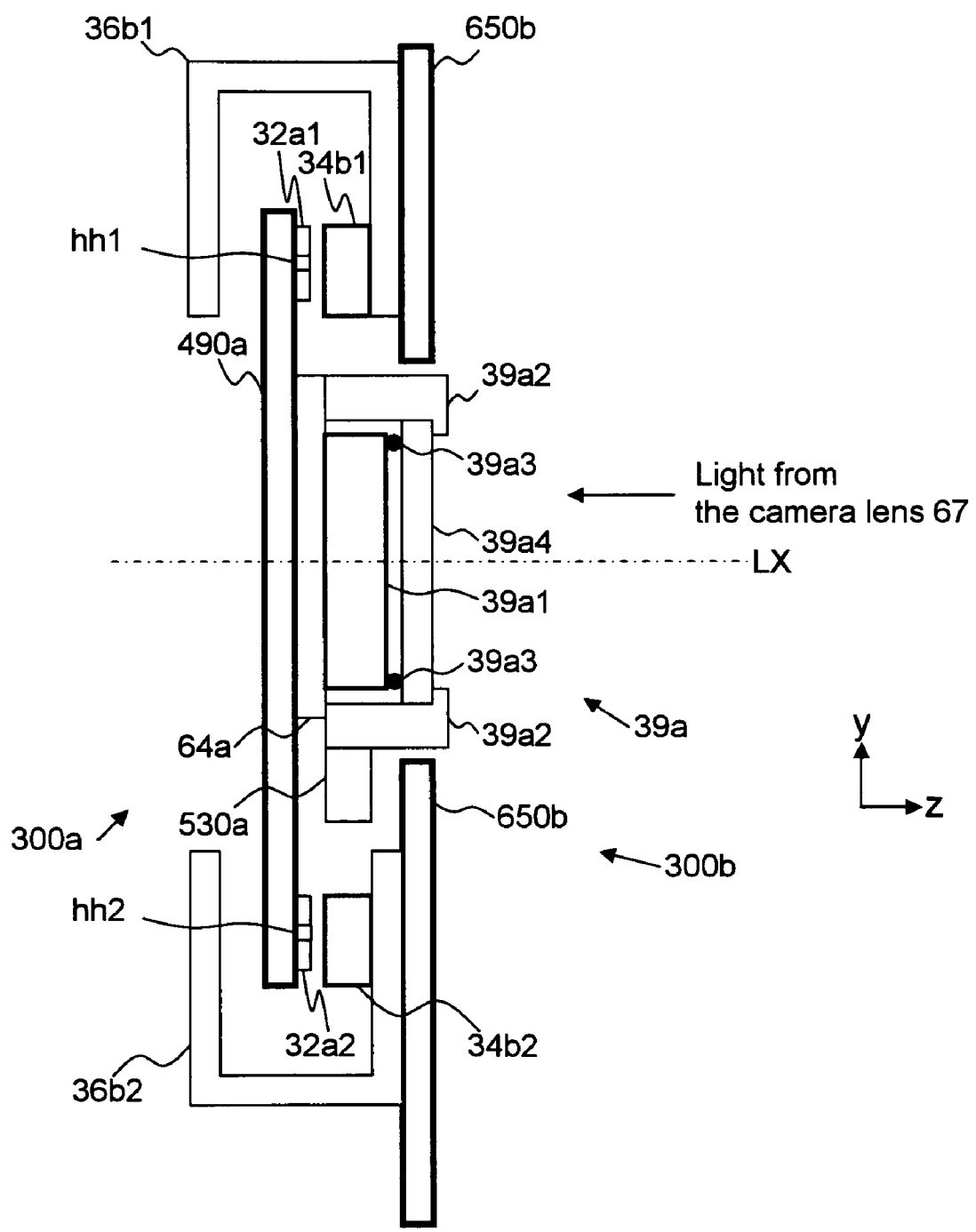
FIG. 9 is a view along line b-b of FIG. 8.

The second movable unit 300a has a first vertical driving coil 31a1, a second vertical driving coil 31a2, a first horizontal driving coil 32a1, a second horizontal driving coil 32a2, an imaging unit 39a, a second hall element unit 440a, a second movable circuit board 490a, a first ball for movement 50a1, a second ball for movement 50a2, a fourth ball for movement 50a4, a fifth ball for movement 50a5, a first ball-bearing for movement 51a, a second ball-bearing for movement 52a, a fourth ball-bearing for movement 54a, a fifth ball-bearing for movement 55a, and a plate 64a (see FIGS. 8 and 9).

The second fixed unit 300b has a first vertical position-detecting and driving magnet 33b1, a second vertical position-detecting and driving magnet 33b2, a first horizontal position-detecting and driving magnet 34b1, a second horizontal position-detecting and driving magnet 34b2, a first vertical position-detecting and driving yoke 35b1, a second vertical position-detecting and driving yoke 35b2, a first horizontal position-detecting and driving yoke 36b1, a second horizontal position-detecting yoke 36b2, a second hall element unit 440a, and a second base board 650b.

The second movable unit 300a contacts the second fixed unit 300b, through the first, second, fourth and fifth balls 50a1, 50a2, 50a4, and 50a5. The first ball for movement 50a1 can roll between the first ball-bearing for movement 51a and the second base board 650b. The second ball for movement 50a2 can roll between the second ball-bearing for movement 52a and the second base board 650b. The fourth ball for movement 50a4 can roll between the fourth ball-bearing for movement 54a and the second base board 650b. The fifth ball for movement 50a5 can roll between the fifth ball-bearing for movement 55a and the second base board 650b.

The contacted situation of the second movable unit 300a and the second fixed unit 300b is kept through the first, second, fourth, and fifth balls 50a1, 50a2, 50a4, and 50a5.

The second movable unit 300a is urged in the third direction z, by an urging member such as a spring etc., which is fixed in the photographing apparatus 1. Therefore, the movable and rotatable situation of the second movable unit 300a on the xy plane is maintained. Or, the second fixed unit 300b supports the second movable unit 300a in the movable and rotatable situation.

The location relation between the second movable unit 300a and the second fixed unit 300b in the second embodiment is the same as the location relation between the first movable unit 30a and the first fixed unit 30a in the first embodiment.

The imaging unit 39a, the plate 64a, and the second movable circuit board 490a are attached, in this order along the optical axis LX direction, viewed from the side of the camera lens 67, like the first embodiment. The constructions of the imaging unit 39a and the plate 64a in the second embodiment, are the same as those of the first embodiment. The first, second, fourth, and fifth ball-bearings 51a, 52a, 54a, and 55a are attached to the stage 39a2.

The first vertical driving coil 31a1, the second vertical driving coil 31a2, the first horizontal driving coil 32a1, and the second horizontal driving coil 32a2, are attached to the second movable circuit board 490a.

The coil patterns of the first and second vertical driving coils 31a1 and 31a2, and the location relations between the optical axis LX and the first and second vertical driving coils 31a1 and 31a2, are the same as those of the first embodiment.

The first horizontal driving coil 32a1 forms a seat and a spiral shape coil pattern. The coil pattern of the first horizontal driving coil 32a1 has a line segment which is parallel to the second direction y, before the second movable unit 300a is rotated. The second movable unit 300a which includes the first horizontal driving coil 32a1, is moved in the first direction x, by the third electro-magnetic force Pw3. The line segment which is parallel to the second direction y, is used for moving the second movable unit 300a in the first direction x. The line segment which is parallel to the second direction y, has a fourth effective length L4.

The third electro-magnetic force Pw3 occurs on the basis of the current direction of the first horizontal driving coil 32a1 and the magnetic-field direction of the first horizontal position-detecting and driving magnet 34b1.

The second horizontal driving coil 32a2 forms a seat and a spiral shape coil pattern. The coil pattern of the second horizontal driving coil 32a2 has a line segment which is parallel to the second direction y, before the second movable unit 300a is rotated. The second movable unit 300a which includes the second horizontal driving coil 32a2, is moved in the first direction x, by the fourth electromagnetic force Pw4. The line segment which is parallel to the second direction y, is used for moving the second movable unit 300a in the first direction x. The line segment which is parallel to the second direction y, has a fifth effective length L5.

The fourth electromagnetic force Pw4 occurs on the basis of the current direction of the second horizontal driving coil 32a2 and the magnetic-field direction of the second horizontal position-detecting and driving magnet 34b2.

In the second embodiment, the first vertical driving coil 31a1 is attached to the right edge area of the second movable circuit board 490a (one of the edge areas of the second movable circuit board 490a in the first direction x), viewed from the third direction z and from the opposite side of the camera lens 67.

Similarly, the second vertical driving coil 31a2 is attached to the left edge area of the second movable circuit board 490a (another of the edge areas of the second movable circuit board 490a in the first direction x), viewed from the third direction z and from the opposite side of the camera lens 67.

Similarly, the first horizontal driving coil 32a1 is attached to the upper area of the second movable circuit board 490a (one of the edge areas of the second movable circuit board 490a in the second direction y), viewed from the third direction z and from the opposite side of the camera lens 67.

Similarly, the second horizontal driving coil 32a2 is attached to the lower area of the second movable circuit board 490a (one of the edge areas of the second movable circuit board 490a in the second direction y), viewed from the third direction z and from the opposite side of the camera lens 67.

The imaging device 39a1 is attached to the middle area of the second movable circuit board 49a between the first and second vertical driving coils 31a1 and 31a2, in the first direction x, and between the first and second horizontal driving coils 32a1 and 32a2, in the second direction y.

The first and second vertical driving coils 31a1 and 31a2 and the first and second horizontal driving coils 32a1 and 32a2, and the imaging device 39a1 are attached on the same side of the second movable circuit board 490a.

The location relation between the first and second horizontal driving coils 32a1 and 32a2 is set up so that the optical axis LX is located between the first and second horizontal driving coils 32a1 and 32a2 in the second direction y, before the second movable unit 300a is rotated.

In other words, the first and second horizontal driving coils 32a1 and 32a2 are arranged in a symmetric position centering on the optical axis LX. A point which receives the third electro-magnetic force Pw3 and a point which receives the fourth electromagnetic force Pw4 are on a line which is parallel to the second direction y.

Therefore, the second movable unit 300a can be rotated around an intersection area between the xy plane and the optical axis LX, in other words a center area of the imaging device 39a1, by the third and fourth electromagnetic forces Pw3 and Pw4. Further, even if the direction of the third electro-magnetic force Pw3 is opposite to or the same as the direction of the fourth electro-magnetic force Pw4, when the quantity of the third electro-magnetic force Pw3 is different from the quantity of the fourth electromagnetic force Pw4, the second movable unit 300a can be rotated.

The first and second horizontal driving coils 32a1 and 32a2 are arranged on the second movable circuit board 490a, where a distance between the center of the imaging device 39a1 and the center area of the first horizontal driving coil 32a1 is the same as a distance between the center of the imaging device 39a1 and the center area of the second horizontal driving coil 32a2.

Because the two coils (31a1 and 31a2) are used for moving the second movable unit 300a in the second direction y and because the two coils (32*a*1 and 32*a*2) are used for moving the second movable unit 300*a* in the first direction x and because the second movable unit 300*a* is movable and rotatable on the xy plane relative to the second fixed unit 300*b* by the first, second, fourth, and fifth balls 50*a*1, 50*a*2, 50*a*4, and 50*a*5, the second movable unit 300*a* can be moved and rotated on the xy plane by the first and second vertical driving coils 31*a*1 and 31*a*2 and the first and second horizontal driving coils 32*a*1 and 32*a*2, relative to the second fixed unit 300*b*.

Further, because the first and second horizontal driving coils 32*a*1 and 32*a*2 and the first and second vertical driving coils 31*a*1 and 31*a*2 are seat coils, the thickness of each coil in the third direction z can be small. Accordingly, even if the first and second horizontal driving coils 32*a*1 and 32*a*2 and the first and second vertical driving coils 31*a*1 and 31*a*2 are composed of a plurality of seat coils which are layered in the third direction z, for increasing the electro-magnetic force, the thickness of each coil in the third direction z hardly increases. Therefore, the second anti-shake apparatus 300 can be downsized by restraining the distance between the second movable unit 300*a* and the second fixed unit 300*b*.

The first and second vertical driving coils 31*a*1 and 31*a*2 and the first and second horizontal driving coils 32*a*1 and 32*a*2 are connected with the second driver circuit 290 which drives the first and second vertical driving coils 31*a*1 and 31*a*2 and the first and second horizontal driving coils 32*a*1 and 32*a*2 through the flexible circuit board (not depicted). The first horizontal PWM duty dx1 is input to the second driver circuit 290 from the PWM 0 of the second CPU 210, and the second horizontal PWM duty dx2 is input to the second driver circuit 290 from the PWM 1 of the second CPU 210, and the first vertical PWM duty dy1 is input to the second driver circuit 290 from the PWM 2 of the second CPU 210, and the second vertical PWM duty dy2 is input to the second driver circuit 290 from the PWM 3 of the second CPU 210. The second driver circuit 290 supplies power to the first horizontal driving coil 32*a*1 corresponding to the value of the first horizontal PWM duty dx1, and to the second horizontal driving coil 32*a*2 corresponding to the value of the second horizontal PWM duty dx2, and to the first vertical driving coil 31*a*1 corresponding to the value of the first vertical PWM duty dy1, and to the second vertical driving coil 31*a*2 corresponding to the value of the second vertical PWM duty dy2, to drive (move and rotate) the second movable unit 300*a*.

When the second movable unit 300*a* is moved in the second direction y, the second CPU 210 controls the values of the first and second vertical PWM duties dy1 and dy2 where the direction of the first electro-magnetic force Pw1 is the same as the direction of the second electro-magnetic force Pw2 and where the quantity of the first electromagnetic force Pw1 is the same as the quantity of the second electromagnetic force Pw2.

When the second movable unit 300*a* is moved in the first direction x, the second CPU 210 controls the values of the first and second horizontal PWM duties dx1 and dx2 where the direction of the third electro-magnetic force Pw3 is the same as the direction of the fourth electromagnetic force Pw4 and where the quantity of the third electromagnetic force Pw3 is the same as the quantity of the fourth electro-magnetic force Pw4.

When the second movable unit 300*a* is rotated on the xy plane, the second CPU 210 controls the values of the first and second vertical PWM duties dy1 and dy2 where the direction of the first electro-magnetic force Pw1 is opposite to the direction of the second electro-magnetic force Pw2 and where the quantity of the first electromagnetic force Pw1 is the same as the quantity of the second electromagnetic force Pw2, or controls the values of the first and second horizontal PWM duties dx1 and dx2 where the direction of the third electromagnetic force Pw3 is opposite to the direction of the fourth electromagnetic force Pw4 and where the quantity of the third electromagnetic force Pw3 is the same as the quantity of the fourth electromagnetic force Pw4.

When the second movable unit 300*a* is moved in the second direction y and rotated on the xy plane, the second CPU 210 controls the values of the first and second vertical PWM duties dy1 and dy2 where the direction of the first electro-magnetic force Pw1 is the same as the direction of the second electro-magnetic force Pw2 and where the quantity of the first electro-magnetic force Pw1 is different from the quantity of the second electromagnetic force Pw2.

When the second movable unit 300*a* is moved in the first direction x and rotated on the xy plane, the second CPU 210 controls the values of the first and second horizontal PWM duties dx1 and dx2 where the direction of the third electromagnetic force Pw3 is the same as the direction of the fourth electromagnetic force Pw4 and where the quantity of the third electro-magnetic force Pw3 is different from the quantity of the fourth electromagnetic force Pw4.

The constructions of the first and second vertical position-detecting and driving magnets 33*b*1 and 33*b*2 are the same as those of the first embodiment.

The first horizontal position-detecting and driving magnet 34*b*1 is attached to the first horizontal position-detecting and driving yoke 36*b*1, under the condition where the N pole and S pole are arranged in the first direction x. The first horizontal position-detecting and driving yoke 36*b*1 is attached to the second base board 650*b* of the second fixed unit 300*b*, on the side of the second movable unit 300*a*, in the third direction z.

The length of the first horizontal position-detecting and driving magnet 34*b*1 in the second direction y, is longer in comparison with the fourth effective length L4 of the first horizontal driving coil 32*a*1. The magnetic-field which influences the first horizontal driving coil 32*a*1 and the first horizontal hall element hh1, is not changed during movement of the second movable unit 300*a* in the second direction y.

The second horizontal position-detecting and driving magnet 34*b*2 is attached to the second horizontal position-detecting and driving yoke 36*b*2, under the condition where the N pole and S pole are arranged in the first direction x. The second horizontal position-detecting and driving yoke 36*b*2 is attached to the second base board 650*b* of the second fixed unit 300*b*, on the side of the second movable unit 300*a*, in the third direction z.

The length of the second horizontal position-detecting and driving magnet 34*b*2 in the second direction y, is longer in comparison with the fifth effective length L5 of the second horizontal driving coil 32*a*2. The magnetic-field which influences the second horizontal driving coil 32*a*2 and the second horizontal hall element hh2, is not changed during movement of the second movable unit 300*a* in the second direction y.

The constructions of the first and second vertical position-detecting and driving yokes 35*b*1 and 35*b*2 are the same as those of the first embodiment.

The first horizontal position-detecting and driving yoke 36*b*1 is made of a soft magnetic material, and forms a square-u-shape channel when viewed from the first direction x. The first horizontal position-detecting and driving magnet 34*b*1, the first horizontal driving coil 32*a*1, and the first horizontal hall element hh1, are inside the channel of the first horizontal position-detecting and driving yoke 36*b*1.

The side of the first horizontal position-detecting and driving yoke 36*b*1, which contacts the first horizontal position-detecting and driving magnet 34*b*1, prevents the magnetic-field of the first horizontal position-detecting and driving magnet 34b1 from leaking to the surroundings.

The other side of the first horizontal position-detecting and driving yoke 36b1 (which faces the first horizontal position-detecting and driving magnet 34b1, the first horizontal driving coil 32a1, and the second movable circuit board 490a) raises the magnetic-flux density between the first horizontal position-detecting and driving magnet 34b1 and the first horizontal driving coil 32a1, and between the first horizontal position-detecting and driving magnet 34b1 and the first horizontal hall element hh1.

The second horizontal position-detecting and driving yoke 36b2 is made of a soft magnetic material, and forms a square-u-shape channel when viewed from the first direction x. The second horizontal position-detecting and driving magnet 34b2, the second horizontal driving coil 32a2, and the second horizontal hall element hh2, are inside the channel of the second horizontal position-detecting and driving yoke 36b2.

The side of the second horizontal position-detecting and driving yoke 36b2, which contacts the second horizontal position-detecting and driving magnet 34b2, prevents the magnetic-field of the second horizontal position-detecting and driving magnet 34b2 from leaking to the surroundings.

The other side of the second horizontal position-detecting and driving yoke 36b2 (which faces the second horizontal position-detecting and driving magnet 34b2, the second horizontal driving coil 32a2, and the second movable circuit board 490a) raises the magnetic-flux density between the second horizontal position-detecting and driving magnet 34b2 and the second horizontal driving coil 32a2, and between the second horizontal position-detecting and driving magnet 34b2 and the second horizontal hall element hh2.

The second hall element unit 440a is a one-axis hall element which has four hall elements that are magnetoelectric converting elements (magnetic-field change-detecting elements) using the Hall Effect. The second hall element unit 440a detects the first horizontal detected-position signal px1, and the second horizontal detected-position signal px2, and the first vertical detected-position signal py1, and the second vertical detected-position signal py2.

One of the four hall elements is a first horizontal hall element hh1 for detecting the first horizontal detected-position signal px1, and one of the four hall elements is a second horizontal hall element hh2 for detecting the second horizontal detected-position signal px2, and one of four hall elements is a first vertical hall element hv1 for detecting the first vertical detected-position signal py1, so that the other is a second vertical hall element hv2 for detecting the second vertical detected-position signal py2 (see FIG. 8).

The first horizontal hall element hh1 may be arranged outside the spiral shape of the winding of the first horizontal driving coil 32a1 in the second direction y. However, it is desirable that the first horizontal hall element hh1 is arranged inside the spiral shape of the winding of the first horizontal driving coil 32a1, and is arranged midway along an outer circumference of the spiral shape of the winding of the first horizontal driving coil 32a1 in the first direction x.

The first horizontal hall element hh1 is layered on the first horizontal driving coil 32a1 in the third direction z. Accordingly, an area in which the magnetic-field is generated for the position-detecting operation and an area in which the magnetic-field is generated for driving the second movable unit 300a are shared. Therefore, the length of the first horizontal position-detecting and driving magnet 34b1 and the length of the first horizontal position-detecting and driving yoke 36b1 can be shortened.

The second horizontal hall element hh2 may be arranged outside the spiral shape of the winding of the second horizontal driving coil 32a2 in the second direction y. However, it is desirable that the second horizontal hall element hh2 is arranged inside the spiral shape of the winding of the second horizontal driving coil 32a2, and is arranged midway along an outer circumference of the spiral shape of the winding of the second horizontal driving coil 32a2 in the first direction x.

The second horizontal hall element hh2 is layered on the first horizontal driving coil 32a2 in the third direction z. Accordingly, an area in which the magnetic-field is generated for the position-detecting operation and an area in which the magnetic-field is generated for driving the second movable unit 300a are shared. Therefore, the length of the second horizontal position-detecting and driving magnet 34b2 and the length of the second horizontal position-detecting and driving yoke 36b2 can be shortened.

The arrangements of the first and second vertical hall elements hv1 and hv2 are the same as those of the first embodiment.

When the center of the imaging device 39a1, passes through the optical axis LX before the second movable unit 300a is rotated, it is desirable that the first horizontal hall element hh1 is located at a place on the second hall element unit 440a which faces an intermediate area between the N pole and S pole of the first horizontal position-detecting and driving magnet 34b1 in the first direction x, viewed from the third direction z, to perform the position-detecting operation utilizing the full size of the range where an accurate position-detecting operation can be performed based on the linear output-change (linearity) of the one-axis hall element.

Similarly, when the center of the imaging device 39a1, passes through the optical axis LX before the second movable unit 300a is rotated, it is desirable that the second horizontal hall element hh2 is located at a place on the second hall element unit 440a which faces an intermediate area between the N pole and S pole of the second horizontal position-detecting and driving magnet 34b2 in the first direction x, viewed from the third direction z Similarly, when the center of the imaging device 39a1, passes through the optical axis LX before the second movable unit 300a is rotated, it is desirable that the first vertical hall element hv1 is located at a place on the second hall element unit 440a which faces an intermediate area between the N pole and S pole of the first vertical position-detecting and driving magnet 33b1 in the second direction y, viewed from the third direction z.

Similarly, when the center of the imaging device 39a1, passes through the optical axis LX before the second movable unit 300a is rotated, it is desirable that the second vertical hall element hv2 is located at a place on the second hall element unit 440a which faces an intermediate area between the N pole and S pole of the second vertical position-detecting and driving magnet 33b2 in the second direction y, viewed from the third direction z.

The second base board 650b is a plate state member which becomes the base for attaching the first horizontal position-detecting and driving yoke 36b1 etc., and is arranged being parallel to the imaging surface of the imaging device 39a1.

In the second embodiment, the second base board 650b is arranged at the side nearer to the camera lens 67 in comparison with the second movable circuit board 490a, in the third direction z. However, the second movable circuit board 490a may be arranged at the side nearer to the camera lens 67 in comparison with the second base board 650b. In this case, the first and second vertical driving coils 31a1 and 31a2 and the first and second horizontal driving coils 32a1 and 32a2 are arranged on the opposite side of the second movable circuit board 490a to the camera lens 67, so that the first and second vertical position-detecting and driving magnets 33b1 and 33b2 and the first and second horizontal position-detecting and driving magnets 34b1 and 34b2 are arranged on the same side of the second movable circuit board 490a as the camera lens 67.

The second hall-element signal-processing unit 450 has a fourth hall-element signal-processing circuit 4501 and a fifth hall-element signal-processing circuit 4502 and a sixth hall-element signal-processing circuit 4503 and a seventh hall-element signal-processing circuit 4504.

The fourth hall-element signal-processing circuit 4501 detects a first horizontal potential-difference (as one part of the first position-information) between the output terminals of the first horizontal hall element hh1, based on an output signal of the first horizontal hall element hh1.

The fourth hall-element signal-processing circuit 4501 outputs the first horizontal detected-position signal px1 to the A/D converter A/D 3 of the second CPU 210, on the basis of the first horizontal potential-difference. The first horizontal detected-position signal px1 specifies a location of the part of the second movable unit 300a which has the first horizontal hall element hh1 (the point A' of FIG. 10), in the first direction x.

The fourth hall-element signal-processing circuit 4501 is connected with the first horizontal hall element hh1 through the flexible circuit board (not depicted).

The fifth hall-element signal-processing circuit 4502 detects a second horizontal potential-difference (as one part of the first position-information) between the output terminals of the second horizontal hall element hh2, based on an output signal of the second horizontal hall element hh2.

The fifth hall-element signal-processing circuit 4502 outputs the second horizontal detected-position signal px2 to the A/D converter A/D 4 of the second CPU 210, on the basis of the second horizontal potential-difference. The second horizontal detected-position signal px2 specifies a location of the part of the second movable unit 300a which has the second horizontal hall element hh2 (the point B' of FIG. 10), in the first direction x.

The fifth hall-element signal-processing circuit 4502 is connected with the second horizontal hall element hh2 through the flexible circuit board (not depicted).

The sixth hall-element signal-processing circuit 4503 detects a first vertical potential-difference (as one part of the second position-information) between the output terminals of the first vertical hall element hv1, based on an output signal of the first vertical hall element hv1.

The sixth hall-element signal-processing circuit 4503 outputs the first vertical detected-position signal py1 to the A/D converter A/D 5 of the second CPU 210, on the basis of the first vertical potential-difference. The first vertical detected-position signal py1 specifies a location of the part of the second movable unit 300a which has the first vertical hall element hv1 (the point C' of FIG. 10), in the second direction y.

The sixth hall-element signal-processing circuit 4503 is connected with the first vertical hall element hv1 through the flexible circuit board (not depicted).

The seventh hall-element signal-processing circuit 4504 detects a second vertical potential-difference (as one part of the second position-information) between the output terminals of the second vertical hall element hv2, based on an output signal of the second vertical hall element hv2.

The seventh hall-element signal-processing circuit 4504 outputs the second vertical detected-position signal py2 to the A/D converter A/D 6 of the second CPU 210, on the basis of the second vertical potential-difference. The second vertical detected-position signal py2 specifies a location of the part of the second movable unit 300a which has the second vertical hall element hv2 (the point D' of FIG. 10), in the second direction y.

The seventh hall-element signal-processing circuit 4504 is connected with the second vertical hall element hv2 through the flexible circuit board (not depicted).

In the second embodiment, the four hall elements (hh1, hh2, hv1 and hv2) are used for specifying the location of the second movable unit 300a which includes the rotation angle.

By using two of the four hall elements (hv1 and hv2), the locations in the second direction y of the two points (the points C' and D') on the second movable unit 300a are specified. By using the other two of the four hall elements (hh1 and hh2), the location in the first direction x of the two points (the points A' and B') on the second movable unit 300a is specified. The location of the second movable unit 300a which includes the rotation angle on the xy plane, can be specified on the basis of the information regarding the locations in the first direction x of the two points and the location in the second direction y of the two points.

Figure 10:
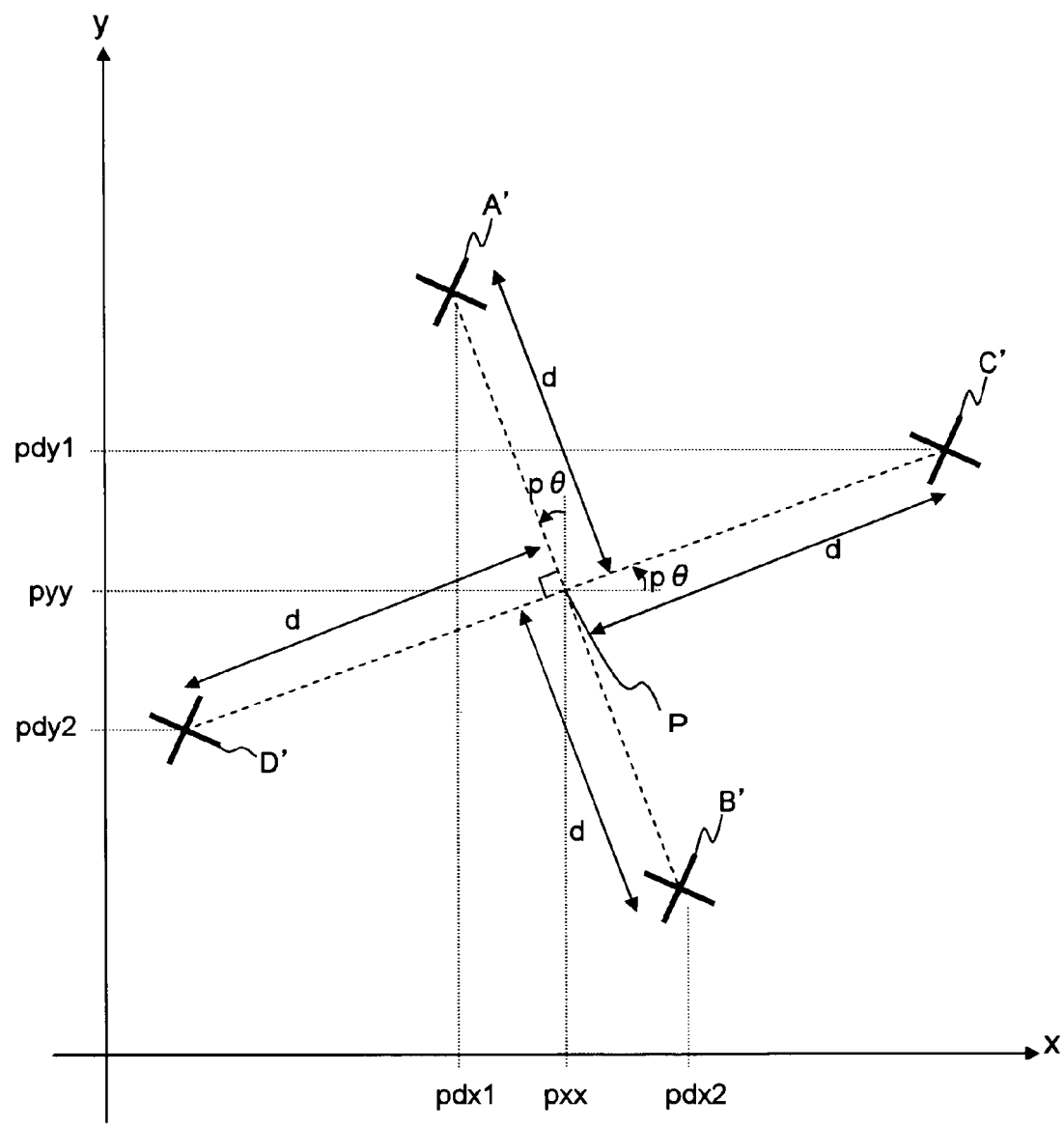
FIG. 10 is an example where the location of the point P is calculated on the basis of location-information of a point A', a point B', a point C', and a point D' on the movable unit, in the second embodiment.

An example is explained using FIG. 10. The location of the point P (pxx, pyy, pθ) is calculated on the basis of the location-information of a point A', a point B', a point C', and a point D' on the second movable unit 300a.

The point A' is a point where the first horizontal hall element hh1 is arranged on the second movable unit 300a. The point B' is a point where the second horizontal hall element hh2 is arranged on the second movable unit 300a. The point C' is a point where the first vertical hall element hv1 is arranged on the second movable unit 300a. The point D' is a point where the second vertical hall element hv2 is arranged on the second movable unit 300a.

The point P is defined as an intersection point between a segment A' B' and a segment C' D'. The segment A' B' is perpendicular to the segment C' D'.

The first and second horizontal hall elements hh1 and hh2, the first and second vertical hall elements hv1 and hv2, and the imaging device 39a1, are arranged on the second movable unit 300a, where the point P agrees with the center of the imaging device 39a1 in the third direction z. In the second embodiment, the location relation of the each part of the second movable unit 300a and the second fixed unit 300b is set where the point P agrees with an intermediate point of the segment A' B' and with an intermediate point of the segment C' D' , and where the lengths of the segment A'P, the segment B'P, the segment C'P, and the segment D'P are the same.

The location in the first direction x of the point A' is detected by the first horizontal hall element hh1, as the first horizontal detected-position signal px1. The location in the first direction x of the point B' is detected by the second horizontal hall element hh2, as the second horizontal detected-position signal px2. The location in the second direction y of the point C' is detected by the first vertical hall element hv1, as the first vertical detected-position signal py1. The location in the second direction y of the point D' is detected by the second vertical hall element hv2, as the second vertical detected-position signal py2.

The data for the position P (pxx, pyy, pθ) are calculated on the basis of the data pdx1 which is converted from the first horizontal detected-position signal px1 in the A/D converting operation, the data pdx2 which is converted from the second horizontal detected-position signal px2 in the A/D converting operation, the data pdy1 which is converted from the first vertical detected-position signal py1 in the A/D converting operation, and the data pdy2 which is converted from the second vertical detected-position signal py2 in the A/D converting operation, a segment A'P having length d, a segment B'P having length d, a segment C'P having length d, and a segment D'P having length d, where pxx=(pdx1+pdx2)÷2, pyy=(pdy1+pdy2)÷2, and pθ=Sin$^{-1}${(pdx2−pdx1)÷2d}=Sin$^{-1}${(pdy1−pdy2)÷2d}. The rotation angle pθ is an angle between the segment C'P and the first direction x or between the segment A'P and the second direction y.

In the first and second embodiments, the movable unit (30*a* and 300*a*) can be rotated on the xy plane, by the coils and the magnets and the yokes which are used for moving the movable unit (30*a* and 300*a*) in the first direction x or the second direction y. Accordingly, the moving apparatus for performing the rotational component of the anti-shake operation for the photographing apparatus, and the moving apparatus for performing the linear movement component of the anti-shake operation for the photographing apparatus, become one body. Therefore, the anti-shake apparatus can be downsized.

Further, the rotation angle of the movable unit (30*a* and 300*a*) can be detected, by the hall elements and the magnets and the yokes which are used for detecting the location of the movable unit (30*a* and 300*a*) in the first direction x or the second direction y. Accordingly, the position-detecting apparatus for detecting the rotation angle for performing the anti-shake operation for the photographing apparatus, and the position-detecting apparatus for detecting the linear movement for performing the anti-shake operation for the photographing apparatus, become one body. Therefore, the anti-shake apparatus can be downsized.

The magnets and yokes which are used for moving (driving) the movable unit may be separated from the magnets and yokes which are used for detecting the position of the movable unit. However, the magnet (or the yoke) is one body in order to detect the location and to drive the movable unit, so that the size of the anti-shake apparatus is reduced, in comparison with when the magnet (or the yoke) is a separated body in order to detect the location and to drive the movable unit.

In the first embodiment, the number of points on the first movable unit 30*a* which receive the electromagnetic force is 3. In the second embodiment, the number of points on the second movable unit 300*a* which receive the electro-magnetic force is 4. However, the number of points on the first movable unit 30*a* (or the second movable unit 300*a*) which receive the electro-magnetic force may be equal to or more than 3, under the condition where the number of points on the movable unit which receive the electro-magnetic force in one of the first direction x and the second direction y, is equal to or more than 2, and where the number of points on the movable unit which receive the electromagnetic force in another of the first direction x and the second direction y, is equal to or more than 1.

It is explained that the points on the movable unit which receive the electromagnetic force in the first direction x is on the line which is parallel to the second direction y, however, it is not limited on the line being parallel to the second direction y. Similarly, the points on the movable unit which receive the electro-magnetic force in the second direction y is not limited on the line which is parallel to the first direction x.

For example, the points on the movable unit which receive the electro-magnetic force in the first direction x may be on a first line which extends along the second direction y, and the points on the movable unit which receive the electro-magnetic force in the second direction y may be on a second line which extends along the first direction x. The first line is barely inclined to the second direction y, and the second line is barely inclined to the first direction y.

In the first embodiment, the number of points on the first movable unit 30*a* which are used for the position-detecting operation, is 3. In the second embodiment, the number of points on the second movable unit 300*a* which are used for the position-detecting operation, is 4. However, the number of the points on the first movable unit 30*a* (or the second movable unit 300*a*) which are used for the position-detecting operation, may be equal to or more than 3, under the condition that the number of points on the movable unit which are used for the position-detecting operation in one of the first direction x and the second direction y, is equal to or more than 2, and where the number of points on the movable unit which are used for the position-detecting operation in another of the first direction x and the second direction y is equal to or more than 1.

It is explained that the first movable unit 30*a* (or the second movable unit 300*a*) has the imaging device 39*a*1. However, the first movable unit 30*a* (or the second movable unit 300*a*) may have a hand-shake correcting lens instead of the imaging device.

Further, it is explained that the driving coils (the first vertical driving coil 31*a*1 etc.) are attached to the first movable unit 30*a* (or the second movable unit 300*a*) and the driving magnets (the first vertical position-detecting and driving magnet 33*b*1 etc.) are attached to the first fixed unit 30*b* (or the second fixed unit 300*b*), however the driving coils may be attached to the fixed unit and the driving magnets may be attached to the movable unit.

Further, it is explained that the hall elements (the first vertical hall element hv1 etc.) are attached to the first movable unit 30*a* (or the second movable unit 300*a*) and the position-detecting magnets (the first vertical position-detecting and driving magnet 33*b*1 etc.) are attached to the first fixed unit 30*b* (or the second fixed unit 300*b*), however the hall elements may be attached to the fixed unit and position-detecting magnets may be attached to the movable unit.

The magnet which generates a magnetic-field, may be a permanent magnet which always generates the magnetic-field, or an electric magnet which generates the magnetic-field when it is needed.

Further, it is explained that the hall element is used for position-detecting as the magnetic-field change-detecting element, however, another detecting element may be used for position-detecting. Specifically, the detecting element may be an MI (Magnetic Impedance) sensor, in other words a high-frequency carrier-type magnetic-field sensor, or a magnetic resonance-type magnetic-field detecting element, or an MR (Magneto-Resistance effect) element. When one of the MI sensor, the magnetic resonance-type magnetic-field detecting element, and the MR element is used, the information regarding the position of the movable unit can be obtained by detecting the magnetic-field change, similar to using the hall element.

Further, the first movable unit 30*a* (or the second movable unit 300*a*) is movable in the first direction x and the second direction y and rotatable on the xy plane, relative to the first fixed unit 30*b* (or the second fixed unit 300*b*). However, any other methods (or means) for moving the movable unit 30*a* on a plane which is perpendicular to the third direction z (the optical axis LX), and for detecting the movable unit 30*a* on the plane, are acceptable.

For example, the movement of the movable unit may only be in one dimension, so that the movable unit can be moved only in the first direction x (not the second direction y) and be rotated on the xy plane. In this case, the parts regarding the movement of the movable unit in the second direction y and regarding the position-detecting operation of the movable unit in the second direction y, such as the first vertical position-detecting element psv1 etc., may be omitted (see FIG. 3 etc.).

Although these embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2004-169376 (filed on Jun. 8, 2004), which is expressly incorporated herein by reference, in its entirety.

The invention claimed is:

1. An anti-shake apparatus of a photographing apparatus, comprising:
   a movable unit that has an imaging device that can be moved and rotated on a plane which is perpendicular to an optical axis of a camera lens of the photographing apparatus; and
   a fixed unit that supports said movable unit to be movable and rotatable on said plane;
   said movable unit and said fixed unit having a moving apparatus that moves and rotates said movable unit;
   a number of points on said movable unit that receive a first force in a first direction by said moving apparatus, being equal to or more than 1, and said first direction being perpendicular to the optical axis;
   a number of points on said movable unit that receive a second force in a second direction by said moving apparatus, being equal to or more than 2, and said second direction being perpendicular to the optical axis and to said first direction;
   said points on said movable unit that receive said first force in said first direction being on a first line which is parallel to or extends in said second direction; and
   said points on said movable unit that receive said second force in said second direction being on a second line which is parallel to or extends in said first direction
   wherein one of said movable unit and said fixed unit has a coil unit that has one or more coils that move said movable unit in said first direction as said moving apparatus, and has two or more coils that move said movable unit in said second direction as said moving apparatus; and
   another of said movable unit and said fixed unit has a driving magnet unit that has said one or more magnets that move said movable unit in said first direction as said moving apparatus, and has said two or more magnets that move said movable unit in said second direction as said moving apparatus, and
   wherein a coil pattern of said coil that moves said movable unit in said first direction, has a line segment which is parallel to said second direction, before said movable unit is rotated, and a coil pattern of said coil that moves said movable unit in said second direction, has a line segment which is parallel to said first direction, before said movable unit is rotated; and
   an N pole and S pole of said magnet that moves said movable unit in said first direction, are arranged in said first direction, and an N pole and S pole of said magnet that moves said movable unit in said second direction, are arranged in said second direction.

2. The anti-shake apparatus according to claim 1, further comprising an urging member that urges said movable unit in a further direction which is parallel to said optical axis;
   said movable unit comprising at least three balls;
   said fixed unit comprising at least three ball bearings in contact with said balls; and
   a number of said balls being equal to a number of said ball bearings.

3. An anti-shake apparatus of a photographing apparatus, comprising:
   a movable unit that has an imaging device that can be moved and rotated on a plane which is perpendicular to an optical axis of a camera lens of the photographing apparatus; and
   a fixed unit that supports said movable unit to be movable and rotatable on said plane;
   said movable unit and said fixed unit having a moving apparatus that moves and rotates said movable unit;
   a number of points on said movable unit that receive a first force in a first direction by said moving apparatus, being equal to or more than 1, and said first direction being perpendicular to the optical axis;
   a number of points on said movable unit that receive a second force in a second direction by said moving apparatus, being equal to or more than 2, and said second direction being perpendicular to the optical axis and to said first direction;
   said points on said movable unit that receive said first force in said first direction being on a first line which is parallel to or extends in said second direction; and
   said points on said movable unit that receive said second force in said second direction being on a second line which is parallel to or extends in said first direction;
   wherein one of said movable unit and said fixed unit has a coil unit that has one or more coils that move said movable unit in said first direction as said moving apparatus, and has two or more coils that move said movable unit in said second direction as said moving apparatus; and
   another of said movable unit and said fixed unit has a driving magnet unit that has said one or more magnets that move said movable unit in said first direction as said moving apparatus, and has said two or more magnets that move said movable unit in said second direction as said moving apparatus,
   wherein said coil unit has first and second coils that move said movable unit in said second direction, and a third coil that moves said movable unit in said first direction; and
   said driving magnet unit has a first driving magnet which faces said first coil, a second driving magnet which faces said second coil, and a third driving magnet which faces said third coil.

4. The anti-shake apparatus according to claim 3, wherein the optical axis is located between said first and second coils in said first direction; and
   a distance between a center of said imaging device and a center of said first coil is the same as a distance between said center of said imaging device and a center of said second coil.

5. The anti-shake apparatus according to claim 4, wherein said second force is an electro-magnetic force having a first electro-magnetic force produced in response to a current of said first coil and a magnetic-field of said first driving magnet, and having a second electro-magnetic force produced in response to a current of said second coil and a magnetic-field of said second driving magnet;
   when said movable unit is moved in said second direction, a direction of said first electro-magnetic force is the same as a direction of said second electro-magnetic force and a quantity of said first electro-magnetic force is the same as a quantity of said second electro-magnetic force;

when said movable unit is rotated on said plane, said direction of said first electro-magnetic force is opposite to said direction of said second electro-magnetic force and said quantity of said first electro-magnetic force is the same as said quantity of said second electro-magnetic force; and when said movable unit is moved in said second direction and rotated on said plane, said direction of said first electro-magnetic force is the same as said direction of said second electro-magnetic force and said quantity of said first electro-magnetic force is different from said quantity of said second electro-magnetic force.

6. The anti-shake apparatus according to claim 3, wherein said coil unit has a fourth coil that moves said movable unit in said first direction; and said driving magnet unit has a fourth driving magnet which faces said fourth coil.

7. The anti-shake apparatus according to claim 6, wherein the optical axis is located between said first and second coils in said first direction, and is located between said third and fourth coils in said second direction;

a distance between a center of said imaging device and a center of said first coil is the same as a distance between said center of said imaging device and a center of said second coil; and a distance between said center of said imaging device and a center of said third coil is the same as a distance between said center of said imaging device and a center of said fourth coil.

8. The anti-shake apparatus according to claim 7, wherein said second force is an electro-magnetic force having a first electro-magnetic force produced in response to a current of said first coil and a magnetic-field of said first driving magnet, and having a second electro-magnetic force produced in response to a current of said second coil and a magnetic-field of said second driving magnet;

said first force is an electro-magnetic-force having a third electro-magnetic force produced in response to a current of said third coil and a magnetic-field of said third driving magnet, and having a fourth electro-magnetic force produced in response to a current of said fourth coil and a magnetic-field of said fourth driving magnet;

when said movable unit is moved in said second direction, a direction of said first electro-magnetic force is the same as a direction of said second electro-magnetic force and a quantity of said first electro-magnetic force is the same as a quantity of said second electro-magnetic force;

when said movable unit is moved in said first direction, a direction of said third electro-magnetic force is the same as a direction of said fourth electro-magnetic force and a quantity of said third electro-magnetic force is the same as a quantity of said fourth electro-magnetic force;

when said movable unit is rotated on said plane, said direction of said first electro-magnetic force is opposite to said direction of said second electro-magnetic force and said quantity of said first electro-magnetic force is the same as said quantity of said second electro-magnetic force, or said direction of said third electro-magnetic force is opposite to said direction of said fourth electro-magnetic force and said quantity of said third electro-magnetic force is the same as said quantity of said fourth electro-magnetic force;

when said movable unit is moved in said second direction and rotated on said plane, said direction of said first electro-magnetic force is the same as said direction of said second electro-magnetic force and said quantity of said first electro-magnetic force is different from said quantity of said second electro-magnetic force; and when said movable unit is moved in said first direction and rotated on said plane, said direction of said third electro-magnetic force is the same as said direction of said fourth electro-magnetic force and said quantity of said third electro-magnetic force is different from said quantity of said fourth electro-magnetic force.

9. The anti-shake apparatus according to claim 3, wherein said movable unit and said fixed unit have a position-detecting apparatus that detects first position-information in said first direction of said movable unit and second position-information in said second direction of said movable unit;

a number of points on said movable unit at which one of said first position-information and said second position-information is detected by said position-detecting apparatus, is equal to or more than 2; and a number of points on said movable unit at which another of said first position-information and said second position-information is detected by said position-detecting apparatus, is equal to or more than 1.

10. The anti-shake apparatus according to claim 3, further comprising an urging member that urges said movable unit in a further direction which is parallel to the optical axis;

said movable unit comprising at least three balls;

said fixed unit comprising at least three ball bearings in contact with said three balls; and a number of said balls being equal to a number of said ball bearings.

11. An anti-shake apparatus of a photographing apparatus, comprising:

a movable unit that has an imaging device that can be moved and rotated on a plane which is perpendicular to an optical axis of a camera lens of the photographing apparatus; and a fixed unit that supports said movable unit to be movable and rotatable on said plane;

said movable unit and said fixed unit having a moving apparatus that moves and rotates said movable unit;

a number of points on said movable unit that receive a first force in a first direction by said moving apparatus, being equal to or more than 1, and said first direction being perpendicular to the optical axis;

a number of points on said movable unit that receive a second force in a second direction by said moving apparatus, being equal to or more than 2, and said second direction being perpendicular to the optical axis and to said first direction;

said points on said movable unit that receive said first force in said first direction being on a first line which is parallel to or extends in said second direction; and said points on said movable unit that receive said second force in said second direction being on a second line which is parallel to or extends in said first direction, and an urging member that urges said movable unit in a third direction which is parallel to the optical axis with respect to which said movable unit is movable and rotatable on said plane;

said movable unit having three or more balls;

said fixed unit having three or more ball bearings that contact with said balls; and a number of said balls being the same as a number of said ball bearings.

12. The anti-shake apparatus according to claim 11, wherein one of said movable unit and said fixed unit has a coil unit that has one or more coils that move said movable unit in said first direction as said moving apparatus, and has two or more coils that move said movable unit in said second direction as said moving apparatus; and another of said movable unit and said fixed unit has a driving magnet unit that has said one or more magnets that move said movable unit in said first direction as said moving apparatus, and has two or more magnets that move said movable unit in said second direction as said moving apparatus.

13. The anti-shake apparatus according to claim 12, wherein a coil pattern of said coil that moves said movable unit in said first direction, has a line segment which is parallel to said second direction, before said movable unit is rotated, and a coil pattern of said coil that moves said movable unit in said second direction, has a line segment which is parallel to said first direction, before said movable unit is rotated; and an N pole and S pole of said magnet that moves said movable unit in said first direction, are arranged in said first direction, and an N pole and S pole of said magnet that moves said movable unit in said second direction, are arranged in said second direction.

14. An anti-shake apparatus of a photographing apparatus, comprising:

a movable unit that has an imaging device that can be moved and rotated on a plane which is perpendicular to an optical axis of a camera lens of the photographing apparatus; and a fixed unit that supports said movable unit to be movable and rotatable on said plane;

said movable unit and said fixed unit having a moving apparatus that moves and rotates said movable unit;

a number of points on said movable unit that receive a first force in a first direction by said moving apparatus, being equal to or more than 1, and said first direction being perpendicular to the optical axis;

a number of points on said movable unit that receive a second force in a second direction by said moving apparatus, being equal to or more than 2, and said second direction being perpendicular to the optical axis and to said first direction;

said points on said movable unit that receive said first force in said first direction being on a first line which is parallel to or extends in said second direction; and said points on said movable unit that receive said second force in said second direction being on a second line which is parallel to or extends in said first direction, wherein said movable unit and said fixed unit have a position-detecting apparatus that detects first position-information in said first direction of said movable unit and second position-information in said second direction of said movable unit;

a number of points on said movable unit at which one of said first position-information and said second position-information is detected by said position-detecting apparatus, is equal to or more than 2; and a number of points on said movable unit at which another of said first position-information and said second position-information is detected by said position-detecting apparatus, is equal to or more than 1, wherein one of said movable unit and said fixed unit has a magnetic-field change-detecting unit that has two or more magnetic-field change-detecting elements which are used for detecting one of said first position-information and said second position-information as said position-detecting apparatus, and has one or more magnetic-field change-detecting elements which are used for detecting another of said first position-information and said second position-information as said position-detecting apparatus;

another of said movable unit and said fixed unit has a position-detecting magnet unit that has two or more position-detecting magnets which are used for detecting one of said first position-information and said second position-information as said position-detecting apparatus, and has one or more position-detecting magnets which are used for detecting another of said first position-information and said second position-information as said position-detecting apparatus;

a number of said magnetic-field change-detecting elements which are used for detecting one of said first position-information and said second position-information is the same as a number of said position-detecting magnets which are used for detecting one of said first position-information and said second position-information; and a number of said magnetic-field change-detecting elements which are used for detecting another of said first position-information and said second position-information is the same as a number of said position-detecting magnets which are used for detecting another of said first position-information and said second position-information.

15. The anti-shake apparatus according to claim 14, wherein said magnetic-field change-detecting elements are hall elements.

16. The anti-shake apparatus according to claim 14, wherein a location of said movable unit which includes a rotation angle of said movable unit on said plane, is specified on the basis of output signals of said two or more magnetic-field change-detecting elements which are used for detecting one of said first position-information and said second position-information, and of output signals of said one or more magnetic-field change-detecting elements which are used for detecting another of said first position-information and second position-information.

17. An anti-shake apparatus of a photographing apparatus, comprising:

a movable unit that has an imaging device and that can be moved in a first direction which is perpendicular to an optical axis of a camera lens of said photographing apparatus, and can be rotated on a plane which is perpendicular to the optical axis; and a fixed unit that supports said movable unit to be movable in said first direction and rotatable on said plane;

said movable unit and said fixed unit having a plurality of moving apparatuses that move said movable unit in said first direction and rotate said movable unit on said plane; and a number of points on said movable unit that receive a force in said first direction by said plurality of moving apparatuses, being equal to or more than 2;

said points of said movable unit that receive said force in said first direction being on a line which is parallel to or extends in a second direction; and said second direction being perpendicular to said first direction and the optical axis, further comprising an urging member that urges said movable unit in a further direction which is parallel to said optical axis;

said movable unit comprising at least three balls;

said fixed unit comprising at least three ball bearings in contact with said balls; and a number of said balls being equal to a number of said ball bearings.

18. The anti-shake apparatus according to claim 17, wherein said number of points are two; and said two plurality of moving apparatuses are arranged in a symmetric position centering around the optical axis, and arranged in said second direction before said movable unit is rotated.

19. An anti-shake apparatus of a photographic apparatus, comprising;

a movable unit that includes an imaging device and that can be rotated on a plane which is perpendicular to an optical axis of a camera lens of the photographic apparatus; and a fixed unit that supports said movable unit so as to be rotatable within the plane;

said movable unit and said fixed unit having a rotating apparatus that rotates said movable unit within the plane; and a number of points on said movable unit that receive a force in a first direction that is perpendicular to the optical axis, by said moving apparatus, being equal to or more than two;

said points of said movable unit that receive said force in said first direction extend along a line which is parallel to or extends in a second direction; said second direction being perpendicular to said first direction and to the optical axis, and further comprising an urging member that urges said movable unit in a further direction which is parallel to the optical axis;

said movable unit comprising at least three balls;

said fixed unit comprising at least three ball bearings in contact with said three balls; and a number of said balls being equal to a number of said ball bearings.

* * * * *